(12) United States Patent
Pelfrey et al.

(10) Patent No.: US 10,219,656 B2
(45) Date of Patent: Mar. 5, 2019

(54) DISPENSER DOSING BASED ON HAND SIZE

(71) Applicant: GOJO Industries, Inc., Akron, OH (US)

(72) Inventors: Keith Allen Pelfrey, Wadsworth, OH (US); Nick E. Ciavarella, Seven Hills, OH (US); Mark A. Bullock, Wooster, OH (US); Mark W. Moore, Aurora, OH (US); Jackson W. Wegelin, Stow, OH (US)

(73) Assignee: GOJO INDUSTRIES, INC., Akron, OH (US)

( * ) Notice: Subject to any disclaimer, the term of this patent is extended or adjusted under 35 U.S.C. 154(b) by 99 days.

(21) Appl. No.: 15/080,810

(22) Filed: Mar. 25, 2016

(65) Prior Publication Data

US 2016/0309967 A1    Oct. 27, 2016

Related U.S. Application Data

(60) Provisional application No. 62/277,146, filed on Jan. 11, 2016, provisional application No. 62/249,506, (Continued)

(51) Int. Cl.
*A47K 5/12* (2006.01)
*B05B 11/00* (2006.01)
(Continued)

(52) U.S. Cl.
CPC .......... *A47K 5/1217* (2013.01); *A47K 5/1202* (2013.01); *A47K 5/1215* (2013.01); (Continued)

(58) Field of Classification Search
CPC ........................... B05B 12/122; A47K 5/1202
(Continued)

(56) References Cited

U.S. PATENT DOCUMENTS

| 2012/0249331 A1* | 10/2012 | Wegelin | G09B 19/0076 340/573.1 |
| 2013/0015200 A1* | 1/2013 | Cittadino | A47K 5/1202 222/52 |

(Continued)

FOREIGN PATENT DOCUMENTS

| WO | 97/33527 A1 | 9/1997 |
| WO | 2013/061446 A1 | 5/2013 |

(Continued)

OTHER PUBLICATIONS

English translation of abstract for WO 2013/061446, published May 2, 2013 (Fujitsu Frontech Ltd.).

*Primary Examiner* — Donnell Long
(74) *Attorney, Agent, or Firm* — Calfee, Halter & Griswold LLP

(57) ABSTRACT

Exemplary methods and systems for dispensing soap sanitizer or lotion as a function of hand size are disclosed herein. An exemplary dispenser for dispensing a soap, sanitizer or lotion includes a housing, a processor in the housing, a reservoir for holding fluid, a pump for pumping the fluid and a sensor for sensing a parameter that is indicative of the hand size. The exemplary dispenser also includes circuitry for determining a dose volume of fluid to be dispensed as a function of the sensed parameter that is indicative of a hand size and circuitry for causing the pump to dispense the dose volume.

15 Claims, 33 Drawing Sheets

Related U.S. Application Data filed on Nov. 2, 2015, provisional application No. 62/138,362, filed on Mar. 25, 2015.

(51) Int. Cl.
*B05B 12/12* (2006.01)
*G05D 7/06* (2006.01)

(52) U.S. Cl.
CPC ...... *B05B 11/00414* (2018.08); *B05B 12/122* (2013.01); *G05D 7/0676* (2013.01)

(58) Field of Classification Search
USPC ..................................................... 222/52, 63
See application file for complete search history.

(56) References Cited

U.S. PATENT DOCUMENTS

2013/0200097 A1* 8/2013 Yang .................... A47K 5/1217
 222/52
2014/0355009 A1 12/2014 Lin

FOREIGN PATENT DOCUMENTS

WO 2013/062771 A1 5/2013
WO 2013/149344 A1 10/2013

* cited by examiner

US 10,219,656 B2

DISPENSER DOSING BASED ON HAND SIZE

CROSS REFERENCE TO RELATED APPLICATIONS

This non-provisional utility patent application claims priority to and the benefits of U.S. Provisional Patent Application Ser. No. 62/249,506 filed on Nov. 2, 2015 and entitled DISPENSER DOSING BASED ON HAND SIZE, U.S. Provisional Patent Application Ser. No. 62/277,146 filed on Jan. 11, 2016 and entitled VARIABLE MATERIAL DOSING BASED ON HAND SIZE, and U.S. Provisional Patent Application Ser. No. 62/138,362 filed on Mar. 25, 2015 and entitled LIQUID DISPENSER WITH SELECTIVE PUMP ACTIVATION, which are incorporated herein by reference in their entirety.

BACKGROUND

There is significant evidence that good hand hygiene can prevent the spread of disease and infection. Washing with soap and clean water greatly assists in preventing the transmission of germs, as does the use of hand sanitizers. Results from various studies have lead health organizations like the CDC (Center For Disease Control) and the WHO (World Health Organization) to release guidelines for cleaning and sanitizing hands, which include the use of alcohol based sanitizers. Placement and usage of hand sanitizing stations have thus become common throughout the healthcare industry.

Applying the proper amount of sanitizer is important to effectively reducing or eliminating germs. Most systems dispense a predetermined volume of product. The dispenser components are designed to operate so that the same volume is dispensed every cycle irrespective of how much sanitizer is actually needed to provide an efficacious dose.

SUMMARY

Exemplary methods and systems for dispensing soap sanitizer or lotion as a function of hand size are disclosed herein. An exemplary dispenser for dispensing a soap, sanitizer or lotion includes a housing, a processor in the housing, a reservoir for holding fluid, a pump for pumping the fluid and a sensor for sensing a parameter that is indicative of the hand size. The exemplary dispenser also includes circuitry for determining a dose volume of fluid to be dispensed as a function of the sensed parameter that is indicative of a hand size and circuitry for causing the pump to dispense the dose volume.

Another exemplary dispenser for dispensing a soap, sanitizer or lotion includes a housing, a processor in the housing, memory in circuit communication with the processor, a variable output pump and a sensor for sensing a parameter that is indicative of the hand size. In addition, the exemplary dispenser includes logic for determining a dose volume of fluid to be dispensed as a function of the sensed parameter that is indicative of a hand size and logic for causing the pump to dispense the discrete dose volume.

Another exemplary dispenser for dispensing a soap, sanitizer or lotion includes a housing, a processor in the housing, memory in circuit communication with the processor, a reservoir containing fluid, a pump for pumping the fluid and a sensor for sensing a parameter that is indicative of a user's hand size. The dispenser also includes circuitry for causing the pump to dispense a volume of fluid that is a function of the sensed parameter and the volume of fluid is less for a small hand than it is for a large hand.

An exemplary methodology for dispensing soap, sanitizer or lotion includes providing a dispenser having a housing, a fluid reservoir, a processor and a sensor. Sensing a parameter indicative of a hand size of a first user, determining a first volume of fluid to be dispensed to the first user and dispensing the first volume of fluid to the first user. The exemplary methodology further includes sensing a parameter indicative of a hand size of a second user, determining a second volume of fluid to be dispensed to the second user; and dispensing the second volume of fluid to the second user. In this embodiment, the determined first volume of fluid is different than the determined second volume of fluid.

DETAILED DESCRIPTION

This detailed description describes exemplary embodiments in accordance with the general inventive concepts and is not intended to limit the scope of the invention or the claims in any way. Indeed, the invention as described by the claims may be broader than and not limited by the exemplary embodiments set forth herein. Components from one exemplary embodiment may be substituted for, or included with, other components in other embodiments.

Just a few novel aspects of the present invention relate to adjusting the dosage of product dispensed from a product dispenser based on a physical attribute or a of a user, or parameter indicative of a physical attribute, such as, for example, the size of a user's hands. Different manifestations of product dispensers are to be construed as falling within the scope of protection sought by the claimed subject matter, examples of which include wall-mounted dispensers, counter-mounted dispensers and hand-held dispensers, and the like.

Figure 1:
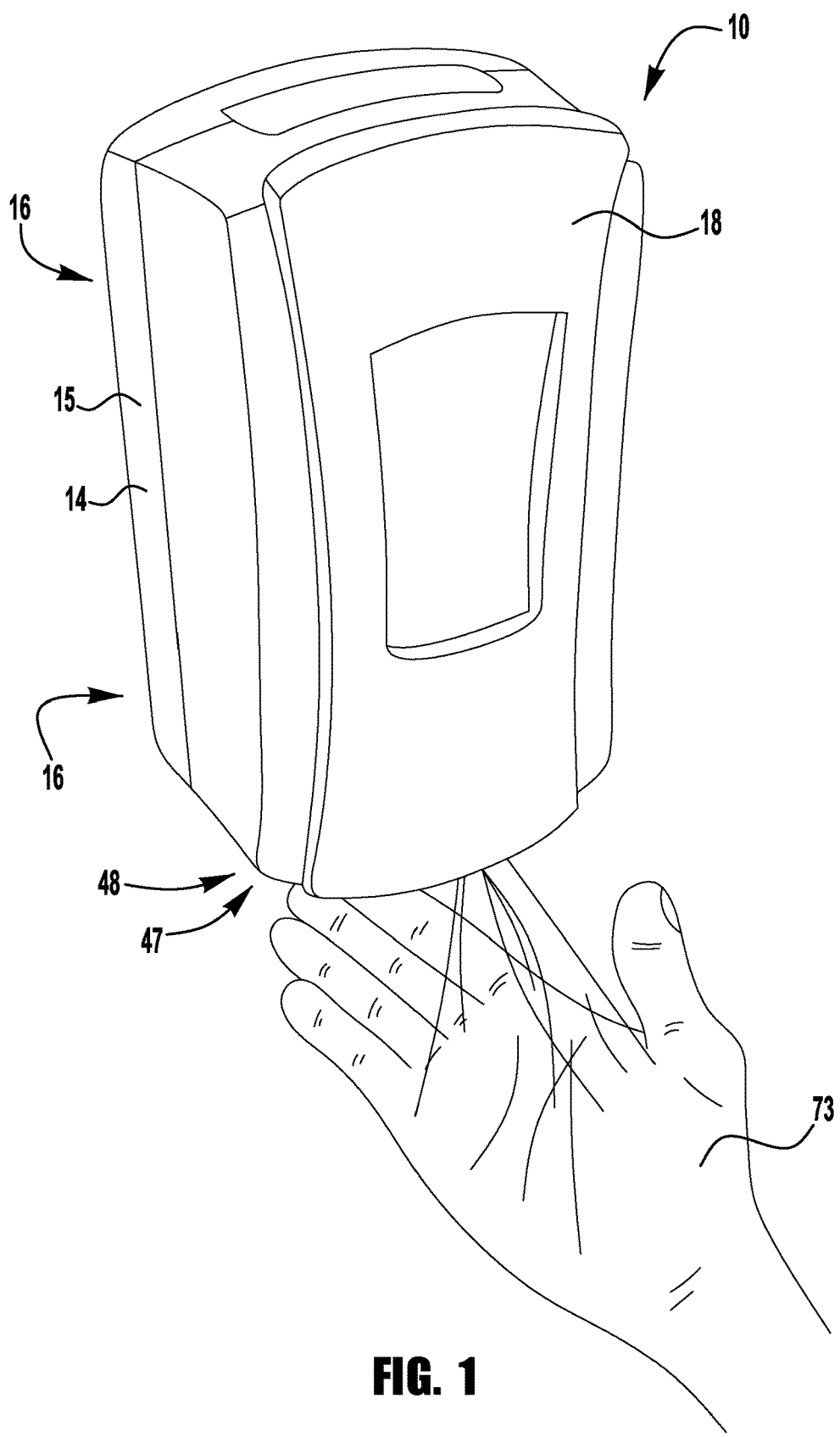
FIG. 1 is an illustration of an exemplary dispenser measuring a parameter of a user's hand.

An exemplary embodiment of wall-mounted product dispenser 10 is depicted in FIG. 1. The product dispenser 10, shown generally, dispenses hand care products, such as soap, lotion or sanitizers. Other products, granular or liquid, may similarly be dispensed from the product dispenser 10.

Figure 2:
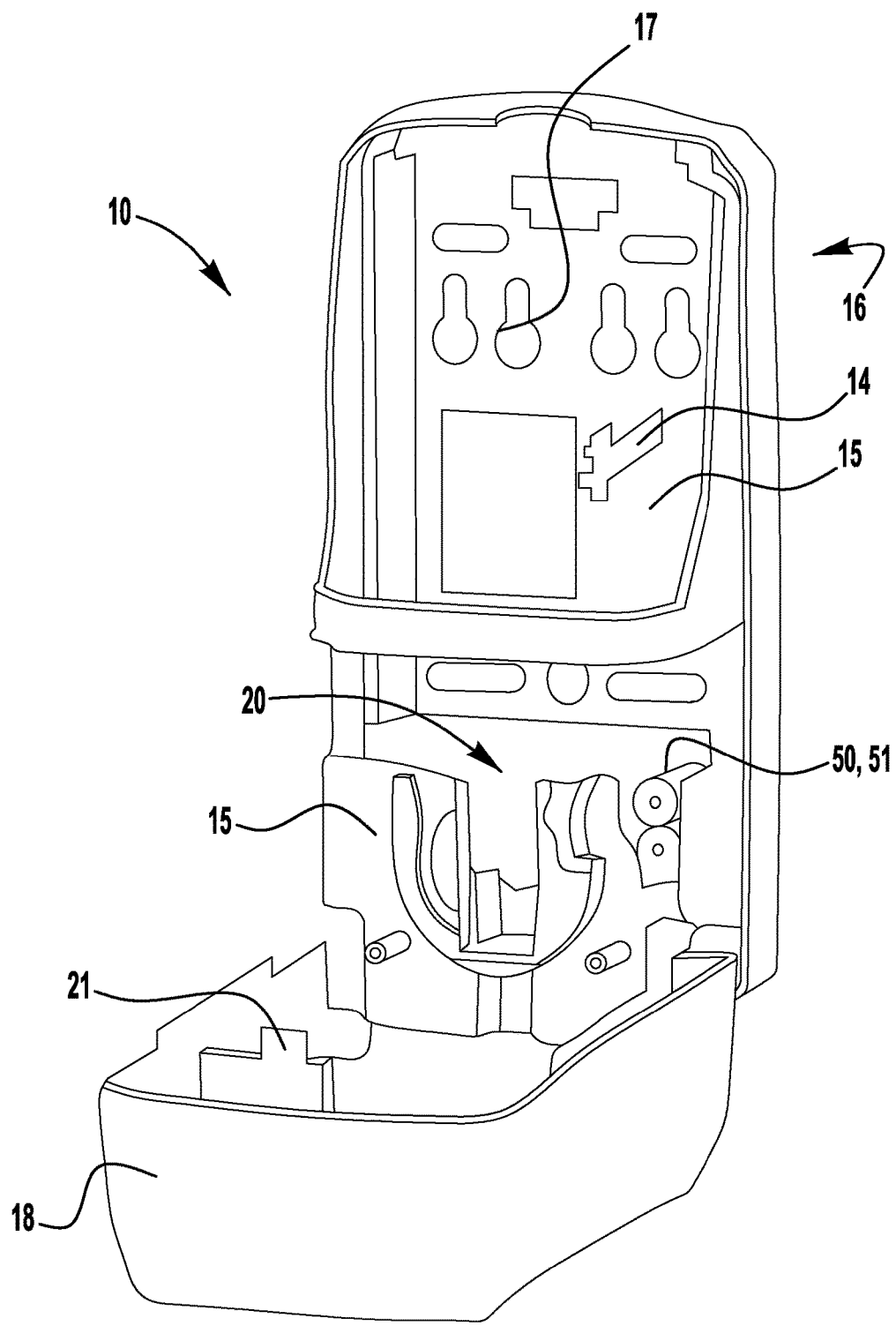
FIG. 2 is an illustration of an interior of the dispenser of FIG. 1.
Figure 3:
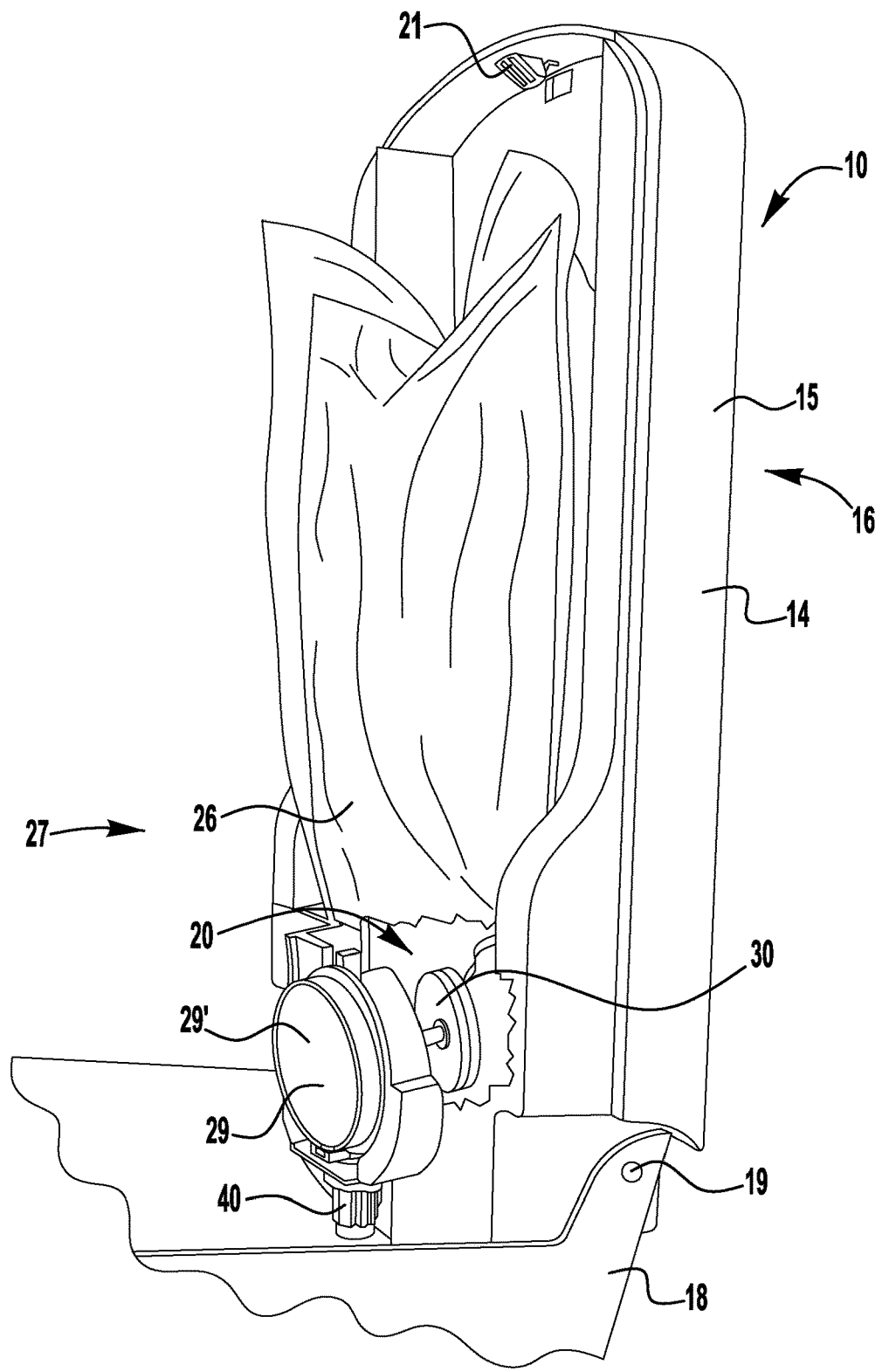
FIG. 3 is an illustration of a refill unit installed into the dispenser of FIG. 1.

As illustrated in FIGS. 1 through 3, the product dispenser 10 includes a housing 14 also referred to as a base 14. The housing 14 or base 14 is made of one or more walls 15 constructed to support the components of the product dispenser 10. Plastic may be used for cost-effective manufacturing of the base 14, as well as other components of the system. A product reservoir 26, which may be readily replaceable, is received by the base 14 and may incorporate a pump 29 for dispensing product. The reservoir 26 and pump 29 may be collectively referred to herein as a refill unit 27. When the refill unit 27 is empty, the refill unit 27 may be removed and a new refill unit 27 may be installed. At a rear side 16 of the base 14, a mounting bracket or mounting holes 17 (shown in FIG. 2) are included for attaching the dispenser 10 to a wall, a table, a dispenser stand or other supporting structure, not shown in the Figures.

The dispenser 10 includes a cover 18 that is connected to the base 14. The cover 18 is pivotally connected to the base 14 via hinge 19 and secured in place by way of a latch 21 or other closure mechanism. The base 14 and cover 18 close together to form an enclosure that limits immediate access to the product dispenser 10. The latch 21 may come equipped with a lock and key to prevent access by unauthorized personnel.

The base 14 is designed to securely receive the product reservoir 26. The walls 15 of the base 14 may be constructed to form a concave region 20 at one end of the product dispenser 10, which function to hold the reservoir 26 in place during use. Before installation into the base 14, the replaceable reservoir 26 may be pre-fitted with a pump 29 and nozzle 40, referred to as a refill unit 27. Once installed, the pump 29 may be connected to a pump actuator 30 (shown in FIG. 3) via couplings used to engage the pump 29 and thereby dispense product. Actuation may be initiated by one or more sensors 45 or an imaging device 47 (reference FIG. 4) configured to detect and measure one or more parameters indicative of a physical attribute of a user, such as, for example, the surface area of the user's hand placed in proximity to the nozzle 40 (reference FIG. 1). As described below, the volume of product dispensed may be tailored based on the one or more physical attributes of the user. Exemplary physical attributes that may be used to adjust the output volume may include, for example: surface area of the user's hands, fingers, palms, or portions thereof; length of a user's hands, fingers, palms; width of a user's hand, fingers, palms; thickness of user's hand, fingers, palm, or portions thereof; or combinations of one or more of the above physical attributes.

Many different embodiments of dispensers may be used herein provided that the dispenser has the ability to dispense different volumes of product to different user's based on the physical attribute of the user. In one exemplary embodiment, a continuous output gear pump 29' is incorporated into the product dispenser 10. The gear pump 29' is actuated for a length of time that is commensurate with the desired dosage of product. The gear pump 29' may be received by the dispenser housing 14 and more specifically may be affixed to the dispenser housing 14. Alternate embodiments are contemplated wherein the pump 29, 29' is secured to the reservoir 26 and may be removed with the reservoir 26 when replaced with another unit 27, as described above. In this way, every component wetted by product is replaced when the dispenser is serviced.

Both continuous-output pumps and fixed-output pumps (finite-cycle pumps) may be used in the product dispenser 10. As alluded to above, continuous-output pumps deliver product for as long as the pump is actuated (and as long as there is product in the reservoir). In other words, it does not have a distinct start and stop cycle. These types of pumps are characterized by their ability to continuously deliver a quantity of product per unit of time, e.g. 0.5 ml/sec. As such, variable dosing is infinitely adjustable depending on how long the pump 29 is actuated. Examples of continuous-output pumps include gear pumps (mentioned above), peristaltic pumps, and wobble-plate pumps, i.e. multi-piston pumps.

Fixed-output pumps may also be used. Fixed-output pumps dispense a predetermined amount of product in a single, finite stroke of the pump. In order to dispense different dosages of product, the fixed output pump may be activated multiple times. Of course, variable dosing is obtainable but only in discrete multiples of the fixed-output pump volume. Examples of discrete cycle pumps include dome pumps, piston pumps, and the like. In some embodiments, rather than activating the pump multiple times, the pump may be "short-stroked." When a pump is short-stroked it dispenses only a partial dose of its full dose potential. For example, if a pump has a 3 ml volume per full-stroke, it may be driven less than a full stroke, such as, for example, a third of a stroke, thereby delivering 1 ml of fluid, or two-thirds of a stroke thereby delivering 2 ml of fluid.

The pump actuator 30 may comprise an electrically powered motor 30. In one particular embodiment, the motor 30 comprises an electrically-powered DC motor 31. The DC motor 31 may be driven by a full duty-cycle DC signal, a PWM (pulse width modulated) signal or other electrical signal configuration as chosen with sound judgment. In this way, variable dosing may be obtained by adjusting the duration and/or signal configuration of the motor control signal.

The product dispenser 10 may further include a power source 50. The power source 50 may comprise, either individually or in combination of, any of the following: mains power, solar or photoelectric power, disposable or rechargeable batteries, power harvested from temperature differential or electro-magnetic waves. This exemplary dispenser 10 includes an onboard power source 50, i.e. batteries 51, which are received by the base 14 or cover 18. The batteries 51 may be removed when depleted of energy and replaced with new batteries. An alternate embodiment is contemplated where the batteries 51 need not be directly mounted to or received by the product dispenser 10, but may be received or installed into the replaceable reservoir 26 or refill unit 27 (reference FIGS. 8 and 9). When the reservoir 26 or refill unit 27 is replaced, the product dispenser 10 is automatically resupplied with fresh batteries 51. For all embodiments contemplated, energy from the power source 50 is used to provide operating power to the product dispenser 10, e.g. to operate the motor 30, to provide power to the dispenser control 60 or to enable operation of imaging device 47 as well as other components of the product dispenser 10.

Figure 5:
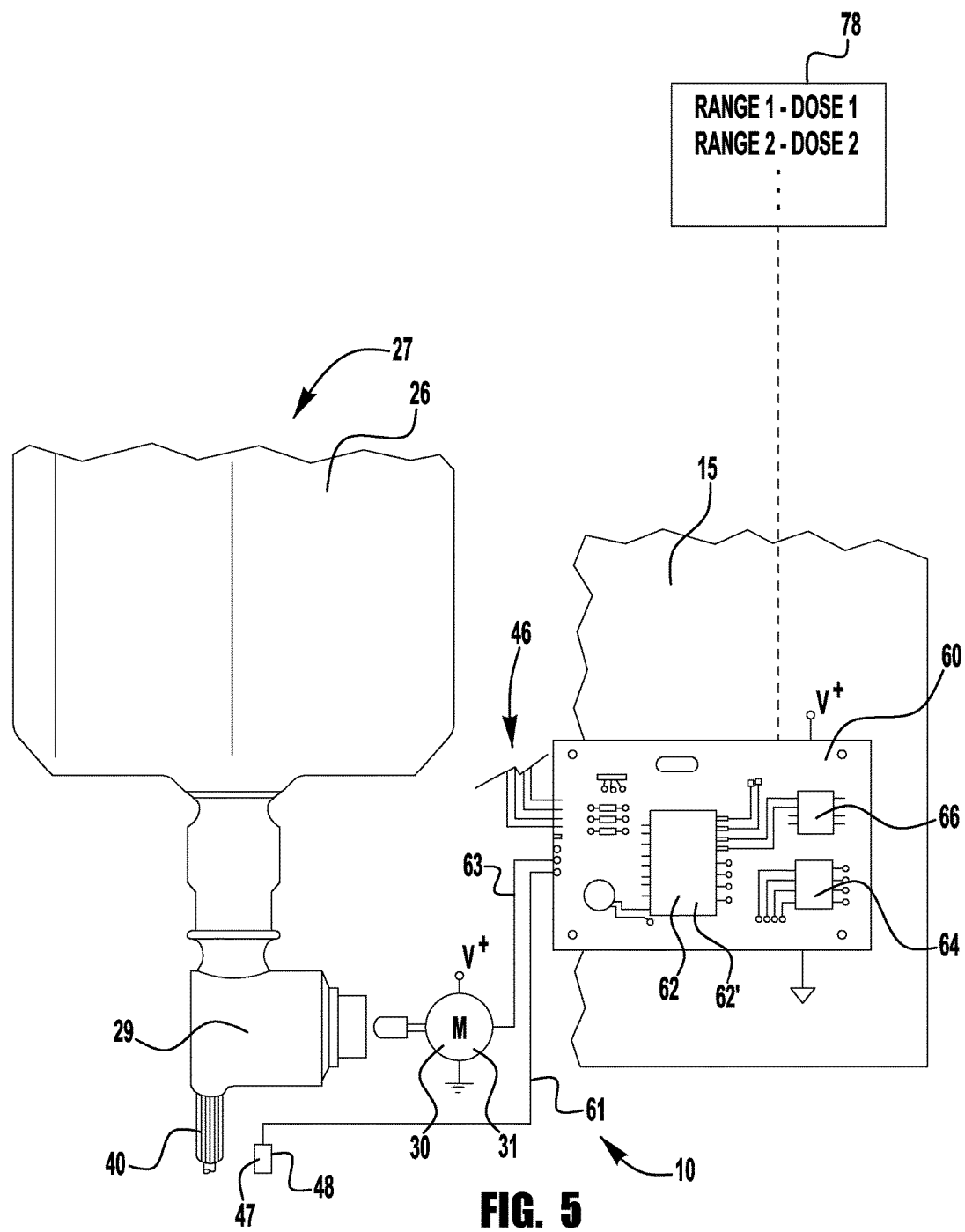
FIG. 5 is an illustration of a schematic representation of a dispenser control.

With reference now to FIG. 5, a dispenser control (also referred to as a controller) is shown schematically as referenced by number 60. In general, the dispenser control 60 manages operations of the product dispenser 10. In one embodiment, dispenser control 60 uses a logic processor 62 (reference FIG. 5) to operate the product dispenser 10. The logic processor 62 includes one or more inputs 61 and/or outputs 63 that function to communicate to other components of the product dispenser 10.

In one particular embodiment, the dispenser control 60 includes an output 63 that is electrically communicated to the motor 31. Output 63 may comprise one or more electrical signals that direct and regulate the flow of power from the batteries 51 to the motor 31. Electrical contacts, relays, transistors or other types of electrical switching devices may be used to selectively deliver power to the motor 31. The dispenser control 60 sends out an electrical signal that may be amplified and/or modulated to control the motor 31. The motor 31 in-turn engages the pump 29 to dispense product from the nozzle 40. It follows that varying the output 63 directly changes the amount of product dispensed.

With continued reference to FIG. 5, the logic processor 62 of the dispenser control 60 may be comprised of a microprocessor 62' or a microcontroller 62', or other processing device. Depending on the type of logic processor used, the dispenser control 60 may include peripheral circuitry 66 to facilitate operation of the logic processor 62. Peripheral circuitry 66 may include: power regulators, analog-to-digital converters, shift registers and the like. Other types of electronic circuitry may also be included for use with the logic processor 62 and may include memory 64, either volatile or nonvolatile, in the form of RAM, ROM and flash memory 64 (e.g. EEPROM 64). Still persons of skill in the art will appreciate that other circuitry may be employed as needed to facilitate operation of the logic processor 62.

A microprocessor 62' or a microcontroller 62' is a programmable device that functions to execute coded instructions or sequences of instructions, i.e. a programmed algorithm. The microprocessor 62' is programmed to receive information from the imaging device 47. Imaging device 47 is configured to obtain imaging data indicative of one or more physical attributes of a user's hand.

The input may comprise pixelated image data electronically converted by the imaging device 47 and/or by electronic circuitry associated with the imaging device 47. The data may be stored in the memory 64 for comparison with "template data" also stored for retrieval by the microprocessor 62', to be discussed in detail below. In some embodiments algorithms may be used calculate the dosage size based on one or more of the physical attributes imaged. The physical attributes may be, for example, hand width, hand length, hand thickness, finger length, finger width, hand area, palm area, and the like. These one or more physical attributes are indicative of a hand size.

Various types of imaging devices that electronically convert images into data may be incorporated into the product dispenser 10. The imaging device 47 may detect images in the visible light range. However, imaging devices that detect non-visible wavelengths may be used as well. Examples of these types of imaging devices include infrared cameras or imaging devices using RF (i.e. radio frequencies).

Figure 6:
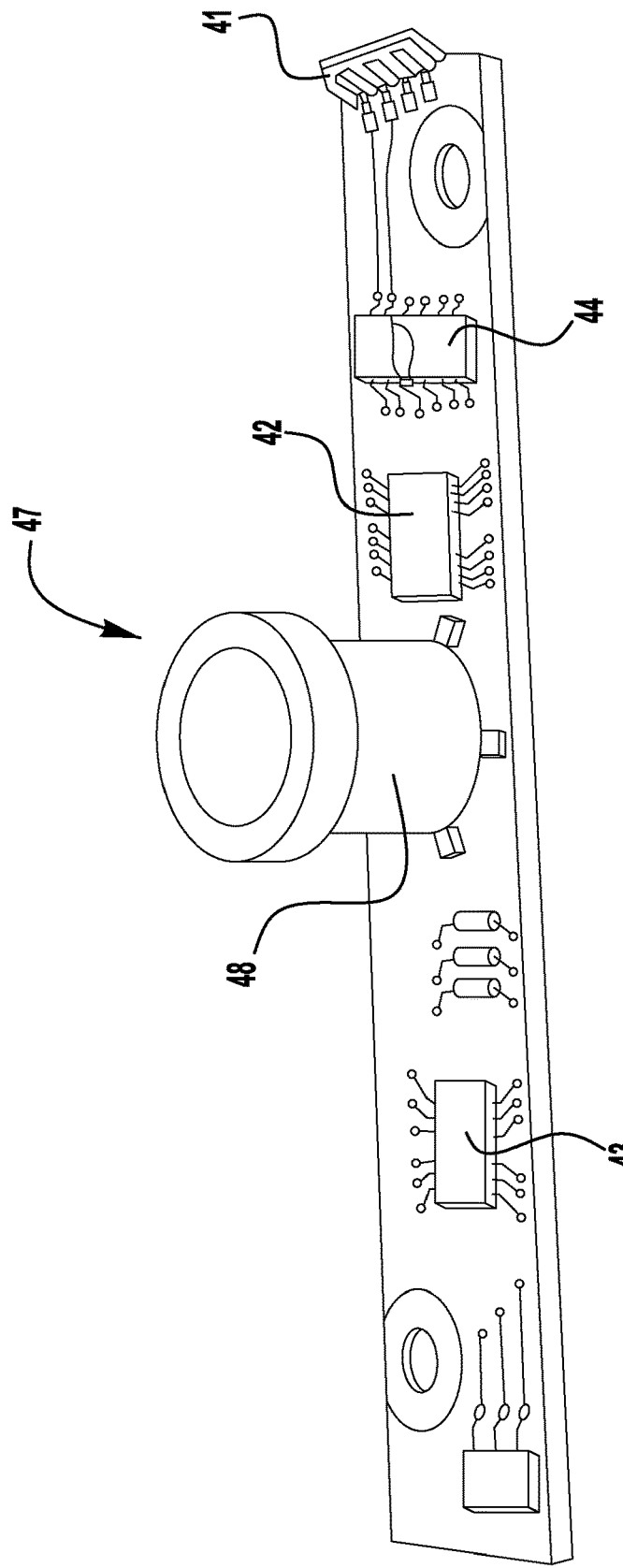
FIG. 6 is an illustration of an imaging device and related electronic circuitry.

With reference to FIG. 6, in one particular embodiment the imaging device 47 comprises a CCD camera 48, which stands for charge coupled device camera. CCD cameras use integrated circuits etched onto the surface of a substrate like Silicon. The integrated circuits form an array of light sensitive elements commonly referred to as pixels. Photons of light impinge on the array thereby exciting the individual pixels. Notably, the output of the pixel changes with the intensity of incident light. It will be appreciated that the intensity values sensed by the array are analog in nature. Analog-to-digital circuitry (ADC) converts those values to digital signals. With the location of each pixel known, the sensed data values are systematically read out resulting in a stream of data. The digital data may be read and transferred at a very high rate of speed. Accordingly, the digitized image may be rapidly communicated to the logic processor 62 and/or stored in memory 64. While the embodiment above specifically discusses a CCD camera or imaging sensor, other types of cameras, such as, for example, CMOS cameras, may be used without departing from the intended scope of coverage of the embodiments of the subject invention.

Still referencing FIG. 6, the CCD camera 48 may come equipped with its own circuitry for digitizing the data and for communicating the stream of data to the logic processor 62. In one embodiment, the CCD camera 48 is packaged together with analog-to-digital circuitry 42 and may also include memory 43 for temporarily storing data captured by the CCD camera 48. The packaged CCD camera 48 may further include circuitry for communicating with the logic processor 62, which may itself comprise logic processing circuitry 44. A terminal block 41 or connector 41 may be included for connection to a data bus 46 (reference FIG. 5) that either plugs in to or is hardwired in to the dispenser control 60.

With reference now to FIGS. 4 through 7, the logic processor 62 may be programmed to run image-recognition software for electronically comparing the image captured by the CCD camera 48 with template data stored in memory 64. In some embodiments, the template data may comprise the digitized image of a hand, also referred to as a template image. By comparing the captured camera image with the template image, the image-recognition software determines that a user's hand, and not an indiscriminate object, has been placed in position to receive a customized dosage of product. In doing so, the product dispenser 10 prevents waste by avoiding accidental activation.

Figure 7:
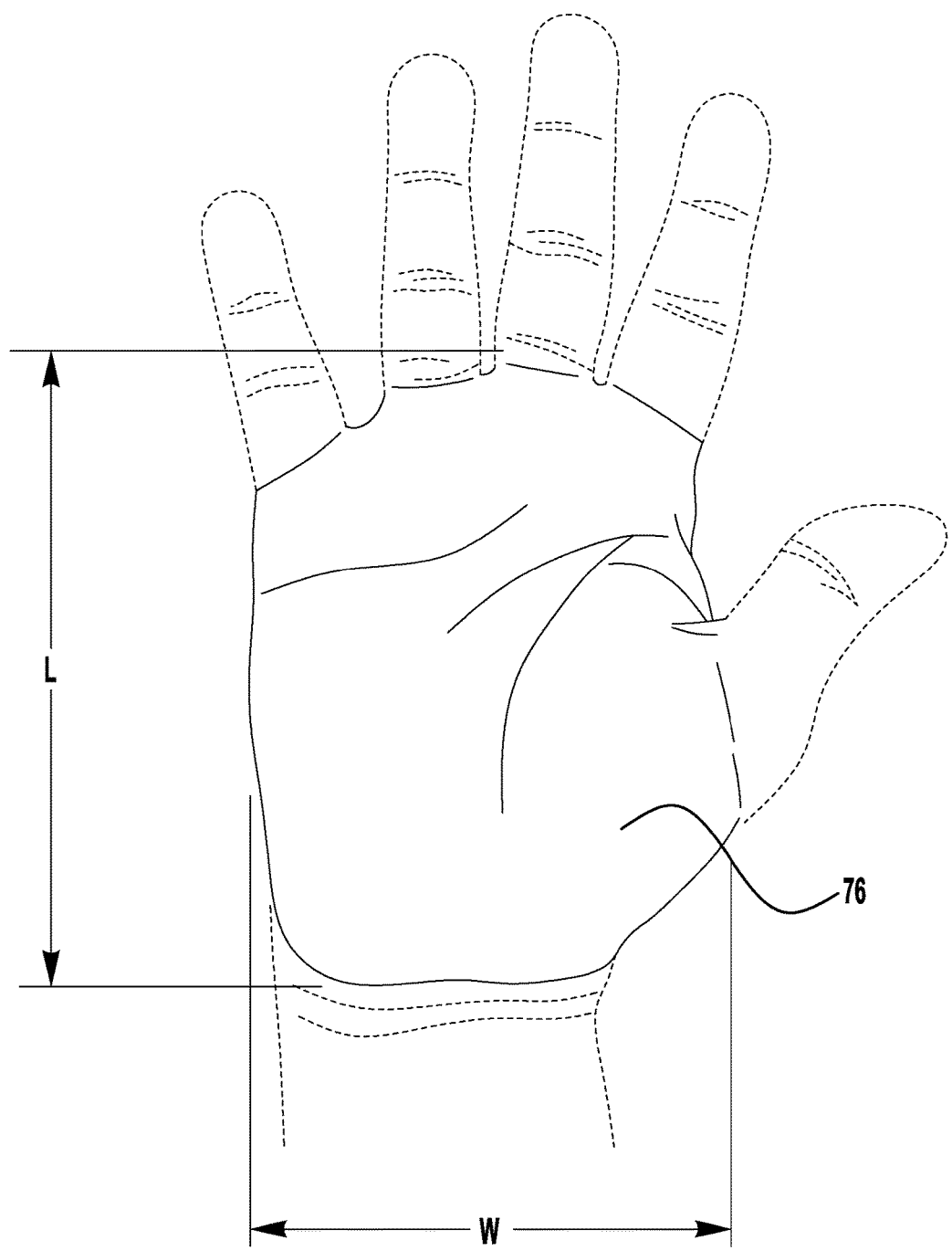
FIG. 7 is an illustration of a hand showing the surface area to be measured by an imaging device.

Referencing FIG. 7, the dispenser control 60, and more specifically the logic processor 62, may employ pattern recognition techniques to measure a physical attribute of a user's hand, such as, for example, the surface area of the user's hand. Although the description of exemplary embodiments herein may be with respect to a selected physical attribute, one or more other physical attributes may be substituted for that physical attribute, provided the devices are capable of being configured to obtain information indicative of that physical attribute. In one embodiment, the logic processor 62 detects the fingers of the user's hand and subsequently identifies the region between the wrist and the base of the fingers, namely the palm 73. Once identified, the overall length L and width W of the user's palm 73 are determined for estimating the surface area of the hand. Alternate embodiments are contemplated whereby the logic processor 62 employs algorithms to measure the perimeter around the user's hand including the fingers for more precisely determining the surface area of the hand or one or more of the other physical attributes identified herein. Other physical attributes that may be identified and used as indicative of a hand size may include, for example, hand width, hand length, hand thickness, finger length, finger width, hand area, palm area, and the like.

With reference again to FIG. 5, after the physical attribute, such as, the surface area of the user's hand has been measured, the logic processor 62 compares the surface area with a table of values 78 stored in memory 64. In one exemplary embodiment, the table of values 78 lists surface areas broken down into ranges of values. Each surface area range is correlated to a specific dosage of product. The correlated dosage values, which may also stored in the table 78, may comprise run-time instructions for activation of the motor 31. As mentioned above, the amount of time that the motor operates directly determines the dosage of product dispensed. As such, the logic processor 62 retrieves the appropriate run-time instruction and generates an output signal to actuate the motor 31 for a specific duration of time or for a number of actuation cycles. In this way, the amount of product dispensed is customized for each user based on a physical attribute of the hand, such as, for example, the size of the hand. In some embodiments, each dispensed dose is customized for the size of specific user's parameter measured. In some embodiment the sizes are grouped into two or more dispense volume sizes and the size of the specific user's parameter measured is used to determine which one of the two or more dispense volumes sizes will be dispensed.

For continuous output pumps, the table of values 78 may include a number (measured in seconds or milliseconds) that is interpreted by the logic processor 62 to be the length of time that an output signal should be generated for actuating the pump 29. For fixed output pumps, the table of values 78 may include a value, which indicates the number of times that the pump 29 must be actuated to deliver the corresponding dosage of product. Notably the precise manner in which the surface area of values, or other physical parameters and the correlated dosage values are stored should not be construed as limiting. Other data formats or manners of data storage may be used.

In one particular embodiment, the product dispenser 10 includes a separate sensor or sensors 45 (reference FIG. 4) that are used to detect when a hand is "in position" for measuring its surface area or other physical attribute. In some embodiments, sensor(s) 45 are used to measure distance, and more specifically to determine the distance between the imaging device 47 and a fixed reference point underneath and nozzle 40, or the user's hands. By being "in position" it is meant that user's hands are placed within a selected distance from the imaging device 47 every time a dispense event occurs. A selected area, or other physical attribute, is thus measured consistently from hand to hand. As such, a customized amount of product may be dispensed based on the size of the user's hands. The types of sensors 45 used may include, but is not limited to: RF sensors or photo reflective sensors.

Figure 4:
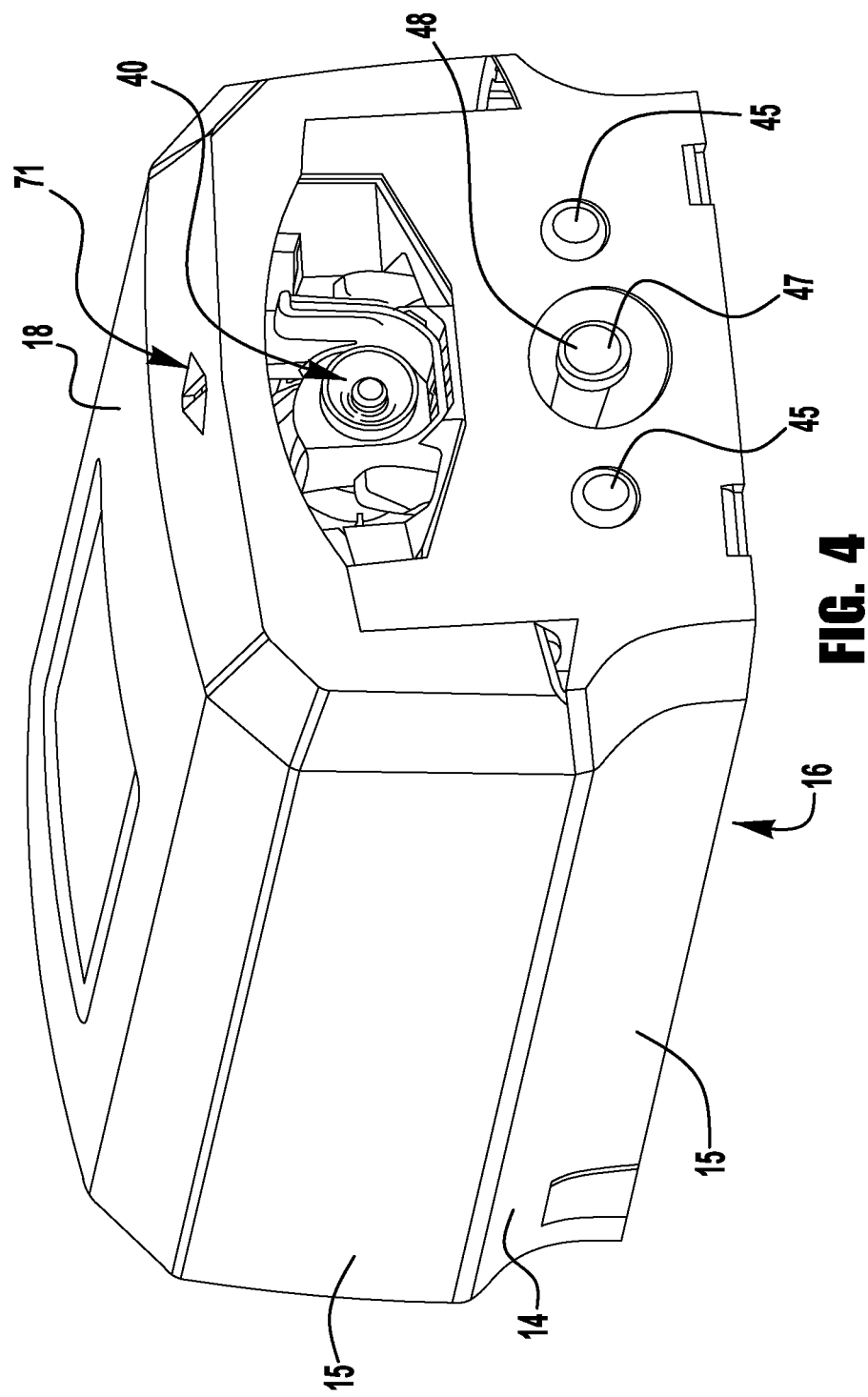
FIG. 4 is an illustration of an underside of the dispenser of FIG. 1 showing an imaging device.

Referencing FIG. 4, in some exemplary embodiments, an "in-position" indicator 71 may also be incorporated into the product dispenser 10 for signaling that the user's hand is within a selected distance for receiving the proper dosage of product. The position indicator 71 may incorporate a visual, audible and/or tactile alert. Examples of the position indicator 71 may comprise: direction-indicating lights incorporated into the cover 18. Alternatively, a light beam may be projected underneath the nozzle 40 when the user's hand is at the proper elevation.

In one embodiment, the sensor 45 is connected to an input of the logic processor 62. An output of the logic processor 62 is connected in a similar manner to the position indicator 71. When the user places their hand beneath the product dispenser 10, the position indicator 71 directs the user to move their hand up or down or side-to-side until it is "in position." The logic processor 62 will then automatically activate the imaging device 47 to measure the surface area, or other physical parameter, of the user's hand.

It will be understood that other means for positioning the user's hand may be incorporated into the product dispenser 10. In one alternate embodiment, physical barriers or guides, not shown in the Figures, may constrain and/or indicate to the user where their hand should be positioned in relation to the nozzle 40. In this embodiment, a switch or other contact sensor may be employed to tell the logic processor 62 that the user's hand is in position whereby the imaging device 47 is activated for measuring the surface area of the user's hand. In some embodiments, no particular positioning of the user's hand or instructions is required.

Figure 8:
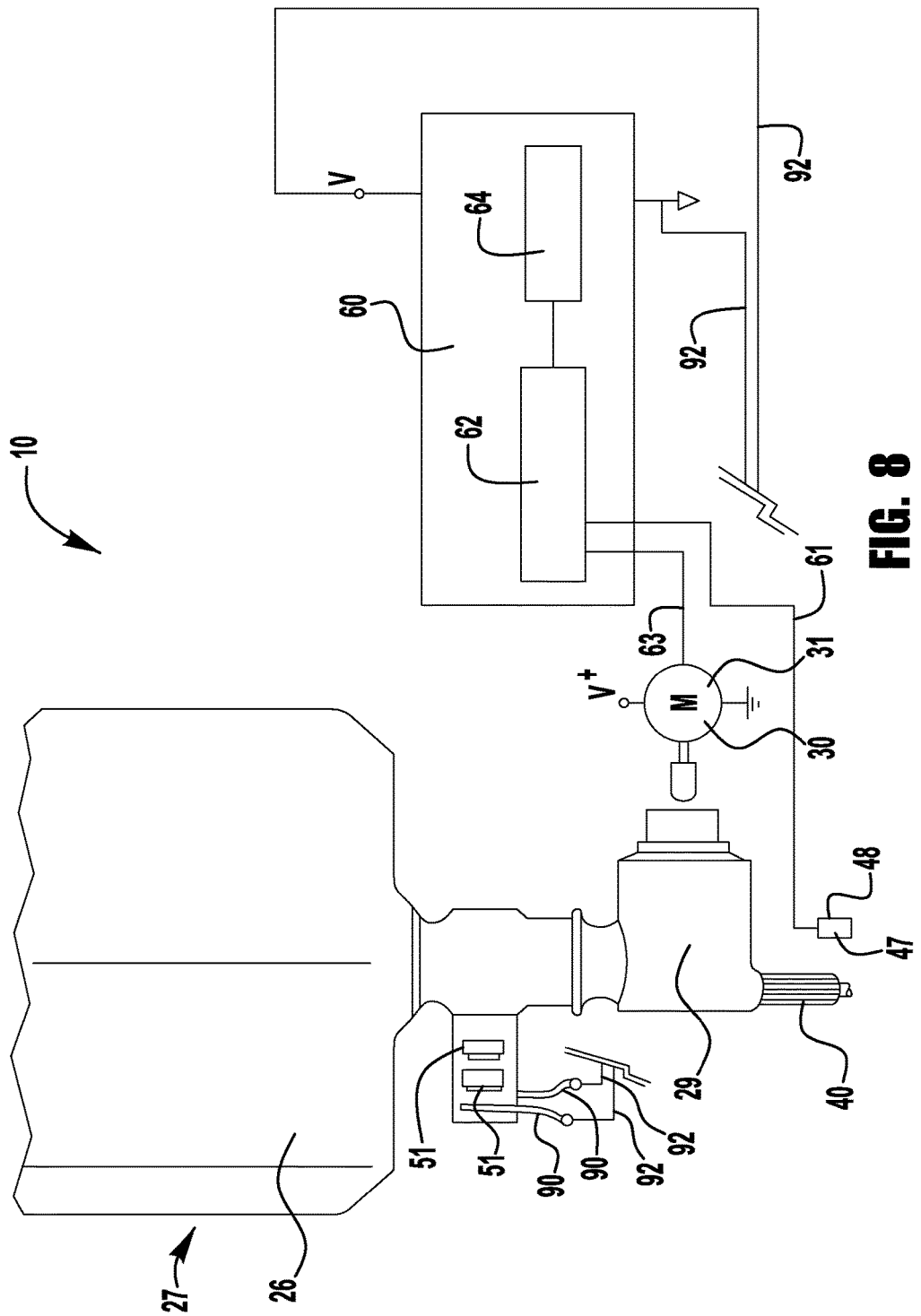
FIG. 8 is an illustration of a schematic representation of batteries incorporated into a refill unit.
Figure 9:
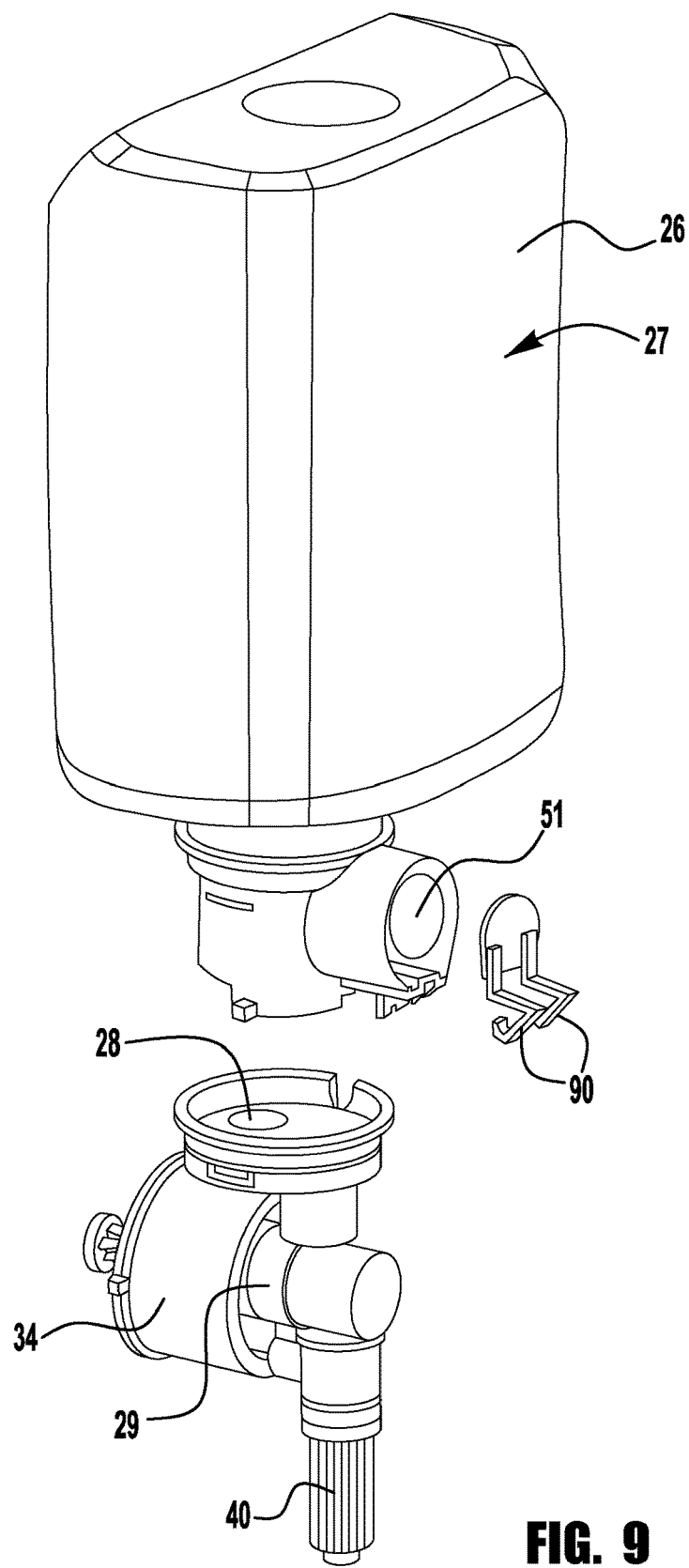
FIG. 9 is an illustration of batteries incorporated into a collar of a refill unit.

With continued reference to FIGS. 8 and 9, another embodiment incorporates batteries 51 into the refill unit 27. The batteries 51 may comprise low power-density batteries, which may include coin cell batteries (also known as button cell batteries). As is known in the art, a coin cell is known for its small size and light weight. However, while a coin cell may be chosen because of its footprint, other types of batteries may be incorporated into the refill unit 27 without departing from the intended scope of coverage of the embodiments of the subject invention. For example, AAA cell alkaline batteries may be integrated into the refill unit 27. It will be readily seen that a fresh supply of energy from the onboard batteries is provided every time the refill unit 27 is replaced.

The housing or collar of the refill unit 27 may be fashioned having one or more recesses configured to receive or enclose the batteries 51. A conductor plate 90 may electrically connect to the respective terminal ends of the batteries 51 and to conductors 92, which extend to direct the flow of electrical current from the batteries 51 to the dispenser control 60, the motor 30, the imaging device 47 or other electrically powered components of the product dispenser 10.

Figure 10:
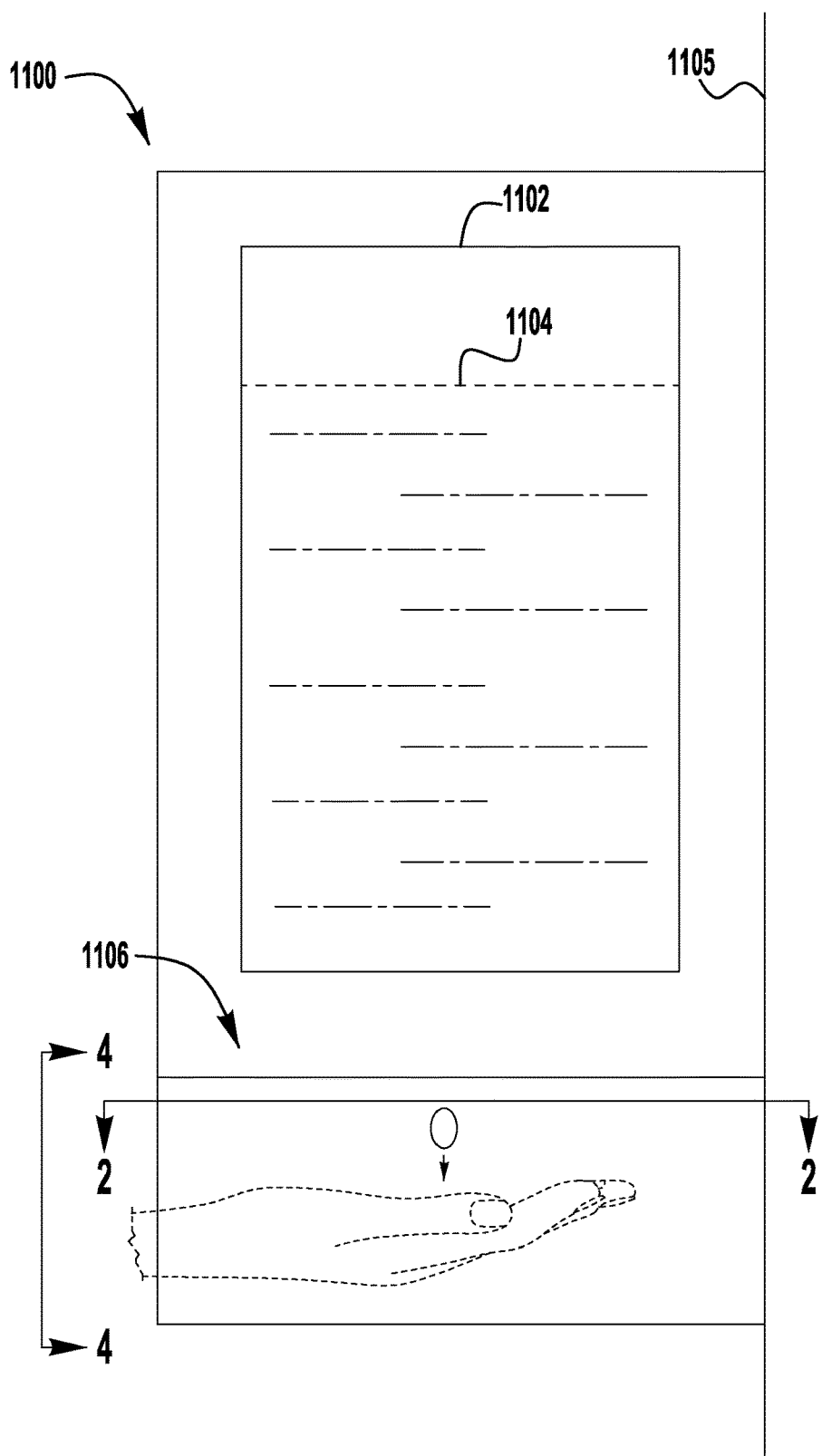
FIG. 10 is a schematic illustration of another exemplary dispenser.

FIG. 10 is a side view of another example dispensing system 1100. The dispensing system 1100 may be used for storing and/or dispensing an associated material 1104, such as, for example, soap or sanitizer. The dispenser 1102 may comprise, for example, a housing, a container, a nozzle, a pump, etc.

The dispensing system 1100 may be attached, for example, to a surface 1105, such as a surface of a wall, door, object, support structure, etc. The dispensing system 1100 may be used in environments such as prisons, jails, detention centers, mental health facilities, hospital, rehabilitation facilities, nursing homes, restaurants, schools, factories, warehouses, etc.

The dispensing system 1100 may comprise an emitter/sensor assembly 1106. The emitter/sensor assembly 1106 may be coupled to the dispenser 1102 and may selectively trigger a dispense event of the material 1104. The illustrated location of the emitter/sensor assembly 1106 with respect to the dispenser 1102 is not intended to be limiting, but rather, defines merely one example location of the emitter/sensor assembly 1106. For example, the emitter/sensor assembly 1106 may be located below the dispenser 1102, along a side of the dispenser 1102, above the dispenser 1102, in front of the dispenser 1102, etc. The emitter/sensor assembly 1106 may be coupled to the dispenser 1102 by mechanical fasteners (e.g., screws, bolts, adhesives, etc.), by being formed with a housing of the dispenser 1102, etc.

Figure 11:
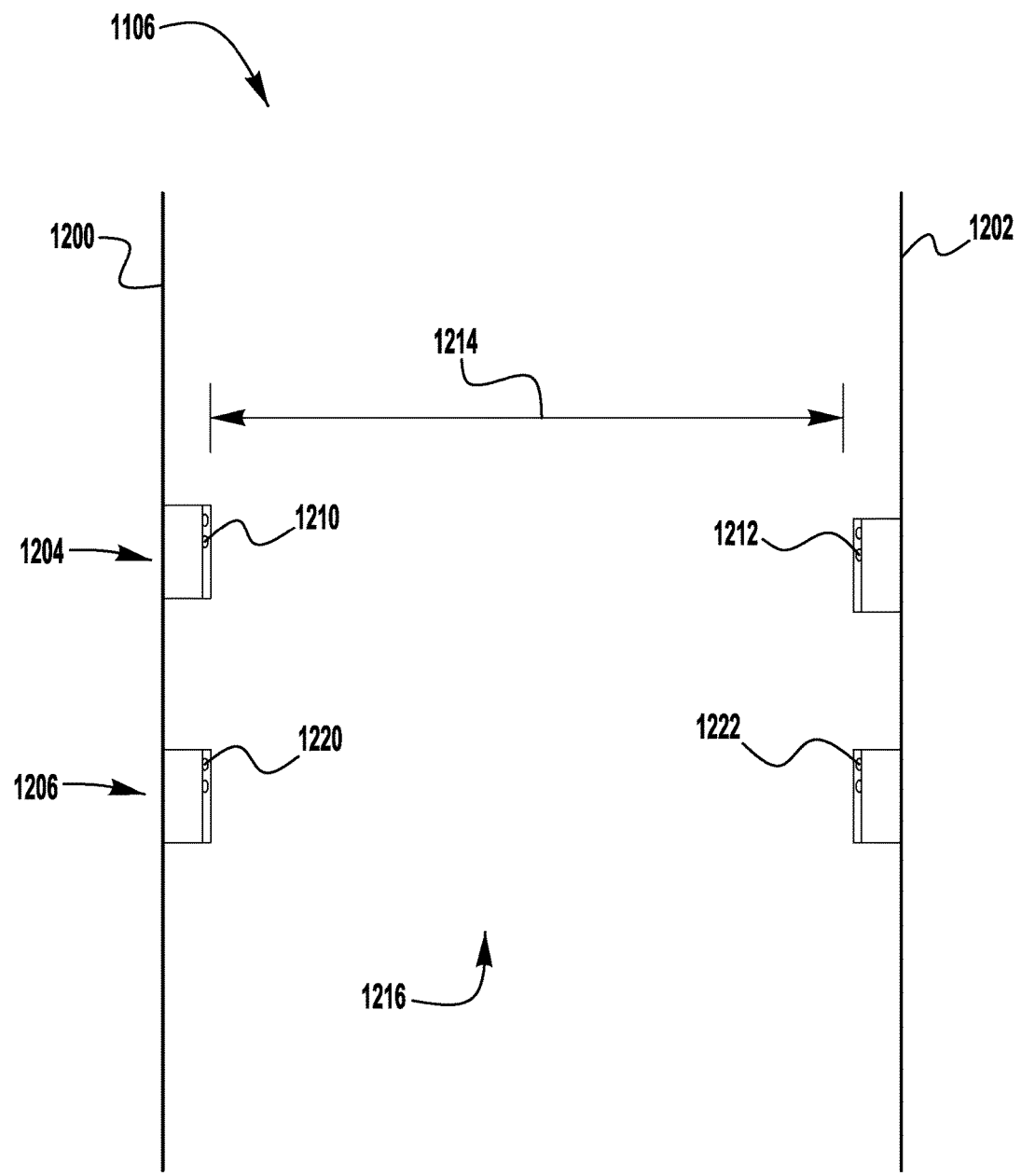
FIG. 11 is an illustration of an exemplary emitter/sensor assembly for a dispenser.

Referring to FIG. 11, a top-down schematic view of the emitter/sensor assembly 1106 as viewed from the perspective indicated by 2-2 in FIG. 10 is illustrated. In an exemplary embodiment, the emitter/sensor assembly 1106 may include one or more walls, such as a first wall 1200 and a second wall 1202. The emitter/sensor assembly 1106 includes a first emitter/sensor array 1204 and a second emitter/sensor array 1206.

The first emitter/sensor array 1204 includes a first emitter/sensor 1210 and a second emitter/sensor 1212. The first emitter/sensor 1210 is coupled to the first wall 1200 while the second emitter/sensor 1212 is coupled to the second wall 1202. The first emitter/sensor 1210 and the second emitter/sensor 1212 are spaced a first distance 1214 apart to define a hand opening 1216 for receiving a hand. The hand opening 1216 may thus be defined at least partially between the first emitter/sensor 1210 and the second emitter/sensor 1212.

The emitter/sensors may include any number of sensors and emitters, such as active sensors, passive sensors, infrared sensors, parallel sensors, triangulated sensors, position sensitive devices, time of flight distance sensors, radio frequency signal strength sensors, capacitive sensors, inductive sensors, microwave sensors, optical sensors, sonar sensors, ultrasonic sensors, laser sensors, temperature detection sensors, etc. and their corresponding emitters. In some embodiments, the first emitter/sensor 1210 and/or the second emitter/sensor 1212 emits a signal into the hand opening 1216 towards the hand, and receive a reflected signal from the hand 1302.

The second emitter/sensor array 1206 includes a third emitter/sensor 1220 and a fourth emitter/sensor 1222. The third emitter/sensor 1220 is coupled to the first wall 1200 while the fourth emitter/sensor 1222 is coupled to the second wall 202. The third emitter/sensor 220 and the fourth emitter/sensor 1222 are spaced the first distance 1214 apart and also serve to define the hand opening 1216 for receiving a hand. The hand opening 1216 may thus be defined at least partially between the third emitter/sensor 1220 and the fourth emitter/sensor 1222.

In some embodiments, the third emitter/sensor 1220 and/or the fourth emitter/sensor 1222 emit a signal into the hand opening 1216 towards the hand, and receive a reflected signal from the hand.

Figure 12:
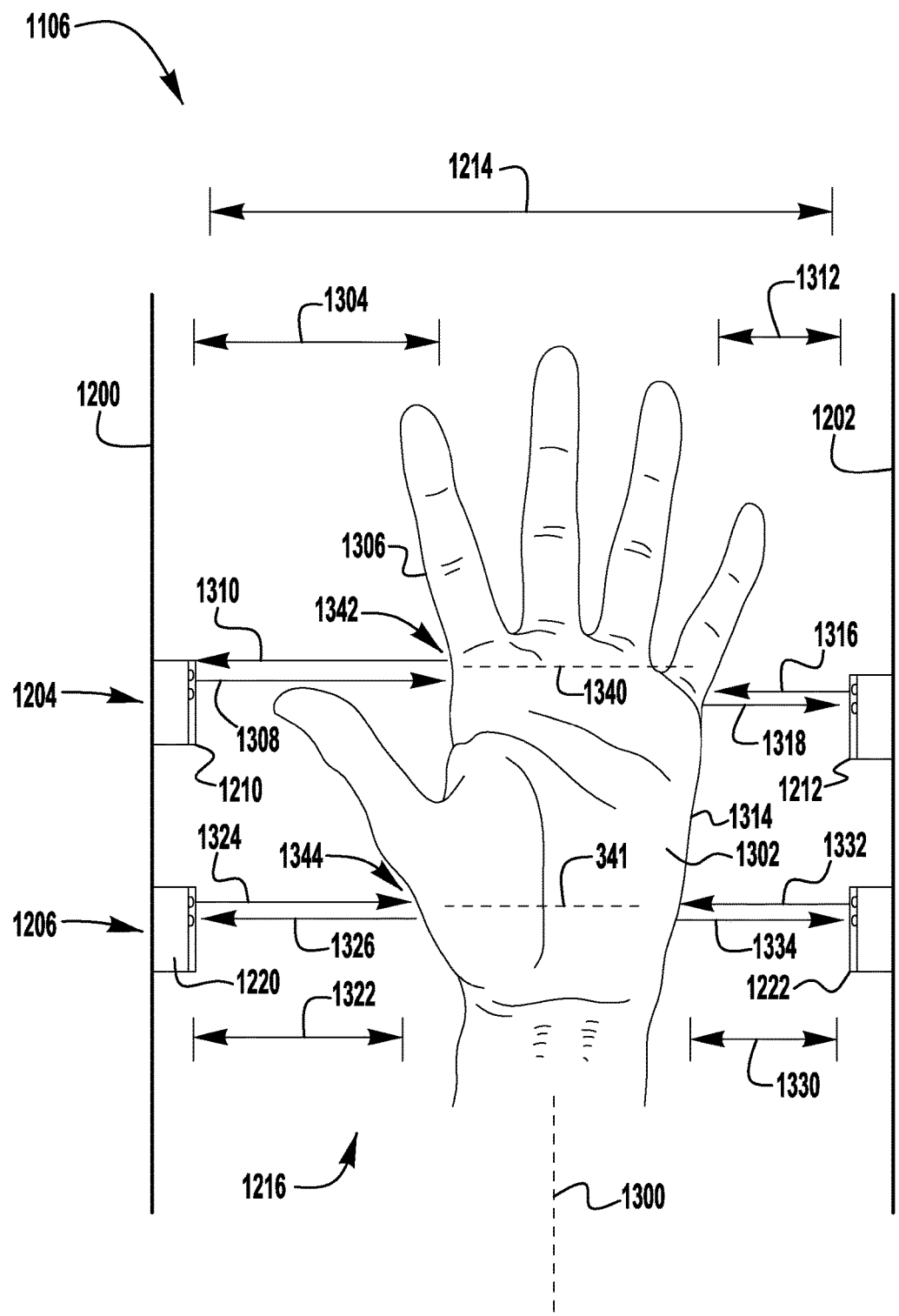
FIG. 12 is an illustration of the exemplary emitter/sensor assembly for a dispenser.

Referring to FIG. 12, a hand 1302 may be moved into and out of the hand opening 1216 along axis 1300. When the hand 1302 is at least partially located within the hand opening 1216, the first emitter/sensor 1210 determines a first separating distance 1304 between the first emitter/sensor 1210 and a first side 1306 of the hand 1302. The first emitter/sensor 1210 emits a first signal 1308 towards the hand 1302. The first signal 1308 reflects off the first side 1306 of the hand 1302 and the first emitter/sensor 210 receives the first reflected signal 1310.

In addition, the second emitter/sensor 1212 determines a second separating distance 1312 between the second emitter/sensor 1212 and a second side 1314 of the hand 1302. For example, the second emitter/sensor 1212 emits a second emitted signal 1316 towards the hand 1302. The second emitter/sensor 1212 reflects off the hand 1302, whereupon the second emitter/sensor 1212 receives a second reflected signal 1318 from the hand 1302. In some embodiments, emitter/sensor 1210 and emitter/sensor 1212 are coordinated to eliminated cross-contamination of the signals. For example, emitter/sensor 1212 may be turned off or its data ignored when emitter/sensor 1210 is operating. Similarly, emitter/sensor 1210 may be turned off or its data ignored when emitter/sensor 1212 is operating. In some embodiments, the width of the hand is determined based on the first and second separating distances 1304, 1312. In some embodiments, the first emitter/sensor 1210 and/or second emitter/sensor 1212 detect a parameter indicative of a thickness of the hand 1302.

In some embodiments, when the hand 1302 is received within the hand opening 1216, the third emitter/sensor 1220 determines a third separating distance 1322 between the third emitter/sensor 1220 and the first side 1306 of the hand 1302. The third emitter/sensor 1220 emits a third emitted signal 1324 towards the hand 1302. The third emitted signal 1324 reflects off the first side 1306 of the hand 1302, whereupon the third emitter/sensor 1220 receives a third reflected signal 1326 from the hand 1302.

When the hand 1302 is located within the hand opening 1216, the fourth emitter/sensor 1222 detects a fourth separating distance 1330 between the fourth emitter/sensor 1222 and the second side 1314 of the hand 1302. The fourth emitter/sensor 122 emits a fourth emitted signal 1332 towards the hand 1302. The fourth emitted signal 1332 reflects off the hand 1302, whereupon the fourth emitter/sensor 1222 receives a fourth reflected signal 1334 from the hand 1302. In some embodiments, the width of the hand is determined based on the third and fourth separating distances 1322, 1332. In some embodiments, emitter/sensor 1220 and emitter/sensor 1222 are coordinated to eliminated cross-contamination of the signals. For example, emitter/sensor 1222 may be turned off or its data ignored when emitter/sensor 1220 is operating. Similarly, emitter/sensor 1220 may be turned off or its data ignored when emitter/sensor 1222 is operating. In some embodiments, the third emitter/sensor 1220 and/or fourth emitter/sensor 1222 detect a parameter indicative of a thickness of the hand 1302.

In some embodiments, an axis 1340 being substantially parallel to at least one of the first emitted signal 1308, the second emitted signal 1316, the third emitted signal 1324, and/or the fourth emitted signal 1332. The axis 1340 may be substantially perpendicular to the hand axis 1300. In some embodiments, the axis 1340 may intersect the first emitter/sensor 1210 and the second emitter/sensor 1212 while being substantially perpendicular to the hand axis 1300. In some embodiments, a second axis 1341 may intersect the third emitter/sensor 1220 and the fourth emitter/sensor 1222 while being substantially perpendicular to the hand axis 1300.

Dispenser system 1100 includes a controller (not shown) that includes processor, memory and other required circuitry and logic (not shown) for receiving signals from the emitter/sensors 1210, 1212, 1220, 1222 and determining one or more physical attributes, such as, for example, hand width or hand thickness based upon one or more distances and/or thicknesses. In some embodiments, the controller determines a hand size based on a comparison of the first distance 1214, the first separating distance 1304 and the second separating distance 1312. For example, the comparison of the first distance 1214, the first separating distance 1304 and the second separating distance 1312 is done by determining a difference between the first distance 1214 and a sum of the first separating distance 1304 and the second separating distance 1312.

In some exemplary embodiments, the first separating distance 1304 and the second separating distance 1312 may be determined based on a time of flight (e.g., between the time between emitting the emitted signal and receiving the reflected signal), a comparison of signal strengths of the emitted signals and the received signals, etc. In such an example, the size of the hand 1302 at a firsthand location 1342 (e.g., corresponding to a width from the forefinger to the little finger adjacent the palm) may be determined based on information yielded from the first emitter/sensor array 1204.

The controller may further determine a size of the hand 1302 based on a comparison of the first distance 1214, the third separating distance 1322 and the fourth separating distance 1330. For example, the comparison of the first distance 1214, the third separating distance 1322 and the fourth separating distance 1330 includes determining a difference between the first distance 1214 and a sum of the third separating distance 1322 and the fourth separating distance 1330.

In some exemplary embodiments, the third separating distance 1322 and the fourth separating distance 1330 may be determined based on a time of flight (e.g., between the time between emitting the emitted signal and receiving the reflected signal), a comparison of signal strengths of the emitted signals and the received signals, etc. In such an example, the size of the hand 1302 at a second hand location 1344 (e.g., corresponding to a width of the wrist or a base of the palm adjacent the wrist) may be determined based on information yielded from the first emitter/sensor array 1204.

In some exemplary embodiments, the controller may use the signals from the first emitter/sensor array 1204 and the second emitter/sensor array 1206 to determine the size of the hand 1302. By utilizing more than one sensor array, a more accurate size of the hand 1302 may be achieved. For example, the hand sizes at the first hand location 1342 and the second hand location 1344 may be averaged to determine a more accurate size of the hand 1302. In an exemplary embodiment, the emitter/sensor assembly 1106 may determine the hand size at the second hand location 1344. If the hand size at the first hand location 1342 is larger or significantly larger at the first hand location 1342, then it may be determined that the user is spreading his/her fingers. In such an example, the hand size at the second hand location 1344 (e.g., at or adjacent to the wrist) may indicate a small hand size, while the hand size at the first hand location 1342 may indicate an extra large hand size (e.g., due to the user spreading his/her fingers). In such an example, the hand size obtained at the first hand location 1342 may be ignored, discounted, or weighed differently as compared to the hand size obtained at the second hand location.

The controller may activate the dispenser 1102 to dispense to dispense a quantity of the material 1104 based on the size of the hand 1302 determined as a function of the signals received from the emitter/sensor assembly 1106. For example, the quantity of the material may comprise a first quantity when the size of the hand corresponds to a first size. The quantity of the material may comprise a second quantity when the size of the hand corresponds to a second size. The quantity of the material may comprise a third quantity when the size of the hand corresponds to a third size. In some embodiments, the second quantity is greater than the first quantity. In some embodiments, the third quantity is greater than the second quantity. In some embodiments, the dispenser 1102 may dispense the first quantity (e.g., a small quantity) of the material 1104 when a small hand size is detected. The dispenser 1102 may dispense the second quantity (e.g., a medium quantity) of the material 1104 when a medium hand size is detected. The dispenser 1102 may dispense the third quantity (e.g., a large quantity) of the material 1104 when a large hand size is detected. In this way, the emitter/sensor assembly 1106 may determine the size of the hand 1302, and dispense a quantity of the material (e.g., small, medium, large) based on the hand size. In some embodiments, more or less than three different size doses may be dispensed by the dispenser.

In some exemplary embodiments, the controller may determine a location of the hand based on a comparison of the first separating distance 1304 to the second separating distance 1312. For example, when the first separating distance 1304 is less than the second separating distance 1312, then the hand 1302 may be closer to the first emitter/sensor 1210 than the second emitter/sensor 1212. Likewise, when the first separating distance 1304 is greater than the second separating distance 1312, then the hand 1302 may be closer to the second emitter/sensor 1212 than the first emitter/sensor 1210.

In some exemplary embodiments, the controller determines a location of the hand based on a comparison of the third separating distance 1322 to the fourth separating distance 1330. For example, when the third separating distance 1322 is less than the fourth separating distance 1330, then the hand 1302 is closer to the third emitter/sensor 1220 than the fourth emitter/sensor 1222. Likewise, when the third separating distance 1322 is greater than the fourth separating distance 1330, then the hand 1302 is closer to the third emitter/sensor 1220 than the fourth emitter/sensor 1222.

Figure 13:
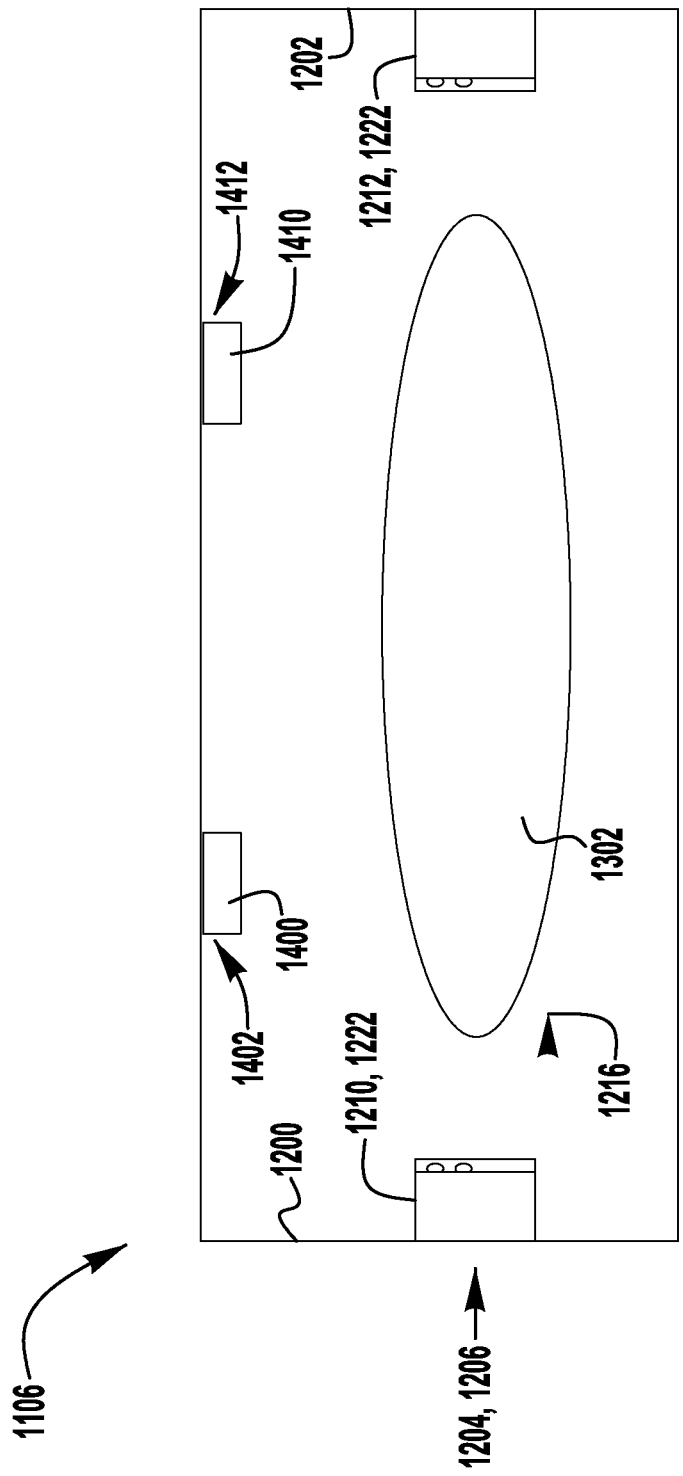
FIG. 13 is an illustration of an exemplary emitter/sensor assembly for a dispenser.

Turning to FIG. 13, a front view of the emitter/sensor assembly 1106 as viewed from the perspective indicated by 4-4 in FIG. 10 is illustrated. In this exemplary embodiment, the emitter/sensor assembly 1106 may be used to activate the dispenser 1102 to dispense the quantity of the material 1104 based on the location of the hand 1302. For example, based on the location of the hand, the controller may activate a first subsystem 1400 (e.g., a nozzle, etc.) of the dispenser 1102 to dispense a first portion of the quantity of the material 1104 from a first location 1402 of the dispensing system 1100. In this exemplary embodiment, when the hand 1302 is in closer proximity to the first emitter/sensor 1210 and the third emitter/sensor 1220, the first subsystem 1400 may dispense the material 1104 from the first location 1402.

In an exemplary embodiment, based on the location of the hand, the controller may activate a second subsystem 1410 (e.g., a nozzle, etc.) of the dispenser 1102 to dispense a second portion of the quantity of the material 1104 from a second location 1412 of the dispensing system 1100. In this example, when the hand 1302 is in closer proximity to the second emitter/sensor 1212 and the fourth emitter/sensor 1222, the second subsystem 1410 may dispense the material 1104 from the second location 1412. In some examples, for a larger sized hand, the first subsystem 1400 and the second subsystem 1410 may dispense a quantity of the material 1104 from the first location 1402 and the second location 1404, respectively, to the hand.

FIG. 13 illustrates the first subsystem 1400 at the first location 1402 and the second subsystem 1410 at the second location 1412, however, the dispensing system 1100 is not limited to the illustrated subsystems and/or locations. Rather, any number of subsystems (e.g., one or more) may be provided so as to accommodate for a varying range of hand sizes. In addition or in the alternative, the subsystems may be oriented along a direction that is parallel to, perpendicular to, at another angle to, etc. the hand axis 1300.

Figure 14:
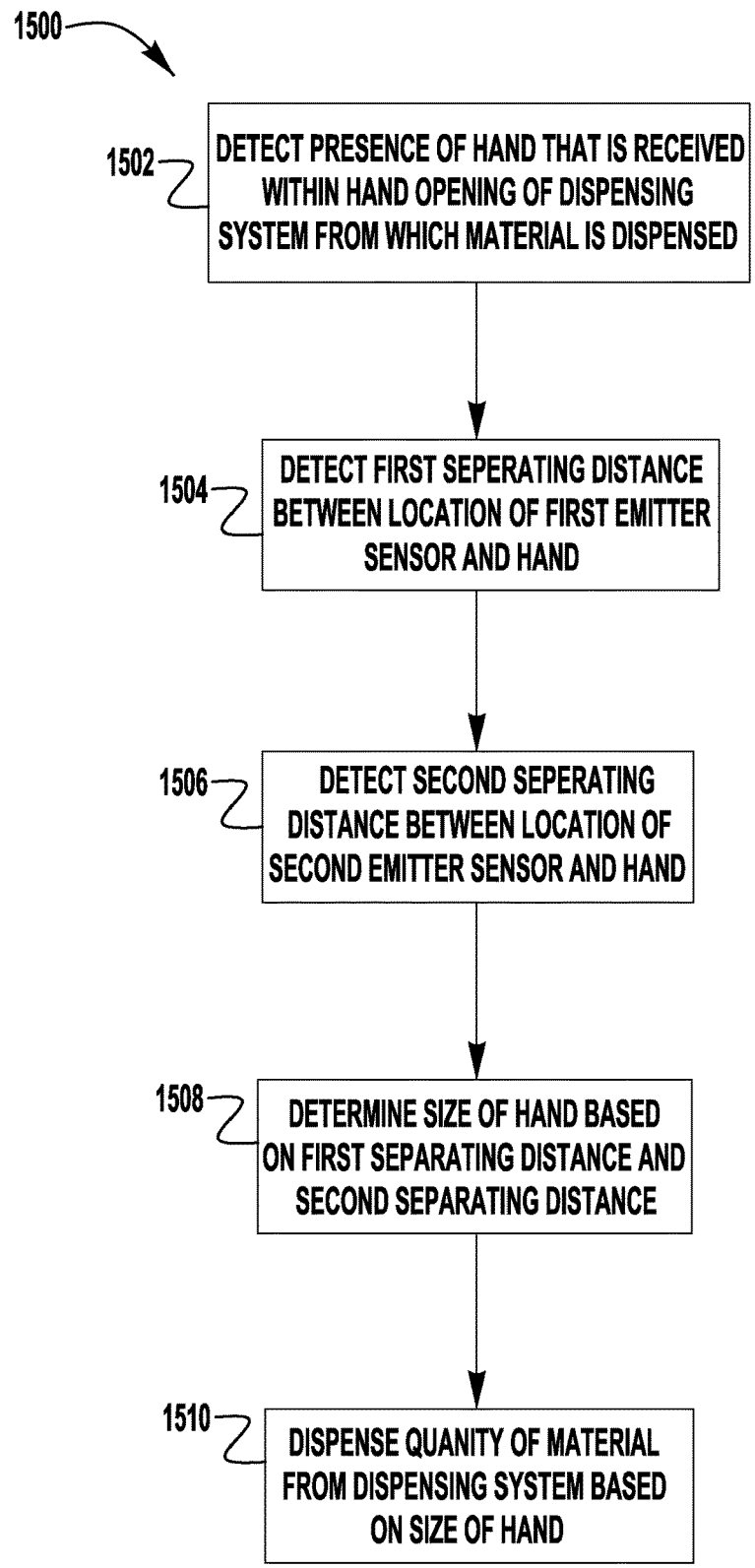
FIG. 14 is an illustration of an exemplary methodology of dispensing a material.

Turning to FIG. 14, an exemplary methodology 1500 of dispensing the material is provided. At block 1502, a determination is made as to whether a hand is present in the hand opening. At block 1504 a first separating distance is determined between the first emitter/sensor and the first side of the hand. At block 1506 a second separating distance is determined between the second emitter/sensor and the second side of the hand. At block 1508 the size of the hand is determined and at block 1510 a quantity of material, that is a function of the size of the user's hand, is dispensed on a user's hand.

FIGS. 15-22 illustrate additional exemplary embodiments of dispensing material based upon physical attributes of a user's hand. In these exemplary embodiments, an array of sensors, such as emitter and detector sensors (e.g., broken beam sensors), and one or more arrays of nozzles for selectively dispensing a liquid material are used. The sensors may sense a position of an object, such as a hand, and may cause a controller to trigger the appropriate nozzles to dispense the liquid material on the object or hand. In an exemplary embodiment, nozzles and fluid passageways are formed from two manifold plates that are coupled together. Pumps push liquid material through the fluid passageways, into pump chambers, and out through nozzles. Capillary action and/or check valves may be used to maintain fluid priming between dispense events.

Figure 15:
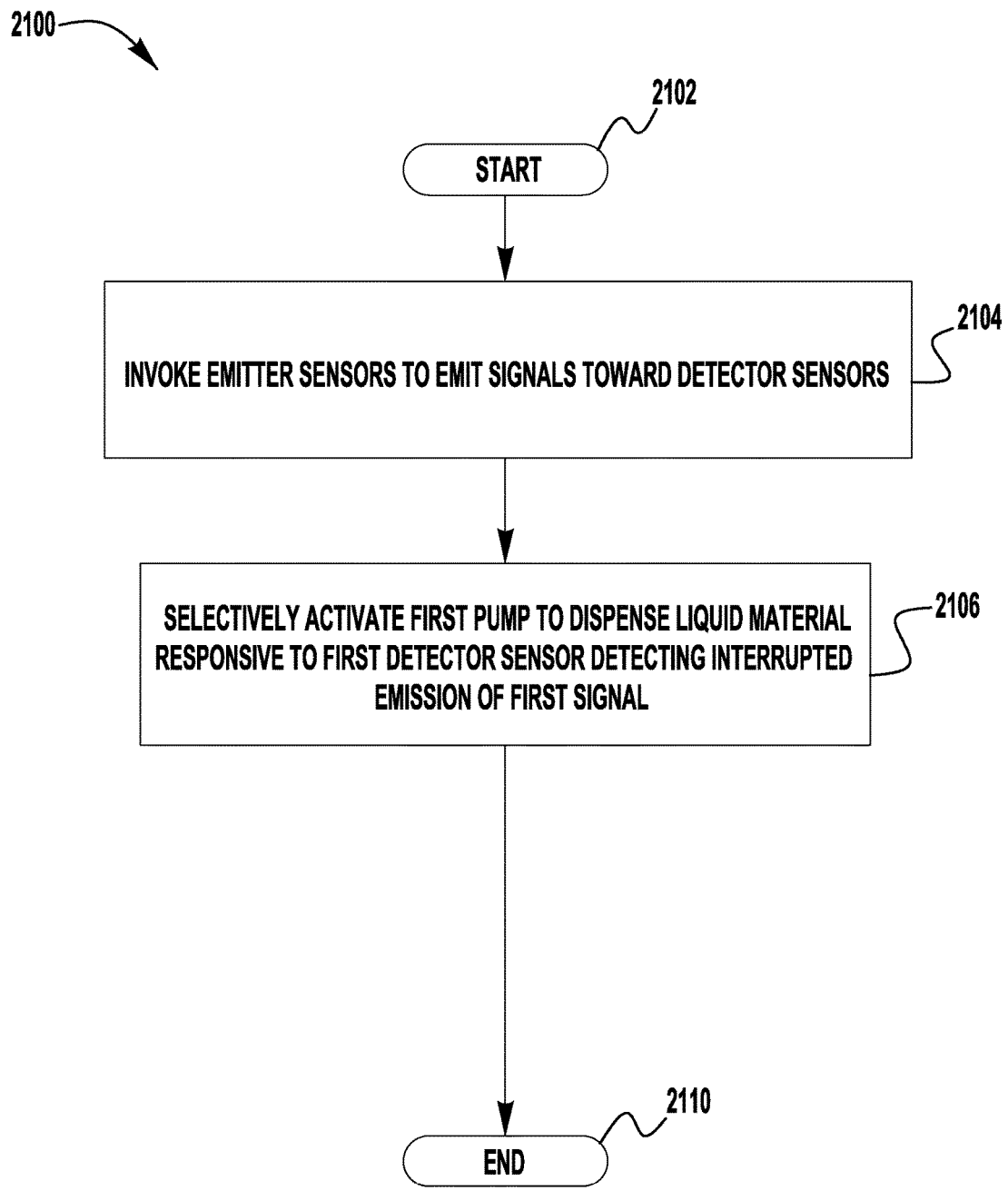
FIG. 15 is an illustration of another exemplary methodology of dispensing material.

FIG. 15 illustrates an exemplary methodology 2100 of selectively dispensing liquid material. At block 2102, the methodology begins. At block 2104 a plurality of emitter/sensors emit signals towards detector sensors of a detector sensor array and determine which detectors received the emitted signal. At block 2106 a plurality of spray nozzles, that correspond to detectors that did not receive the emitted signal, because the emitted signal was blocked by a user's hand, are turned on. The methodology ends at block 2110.

Figure 16A:
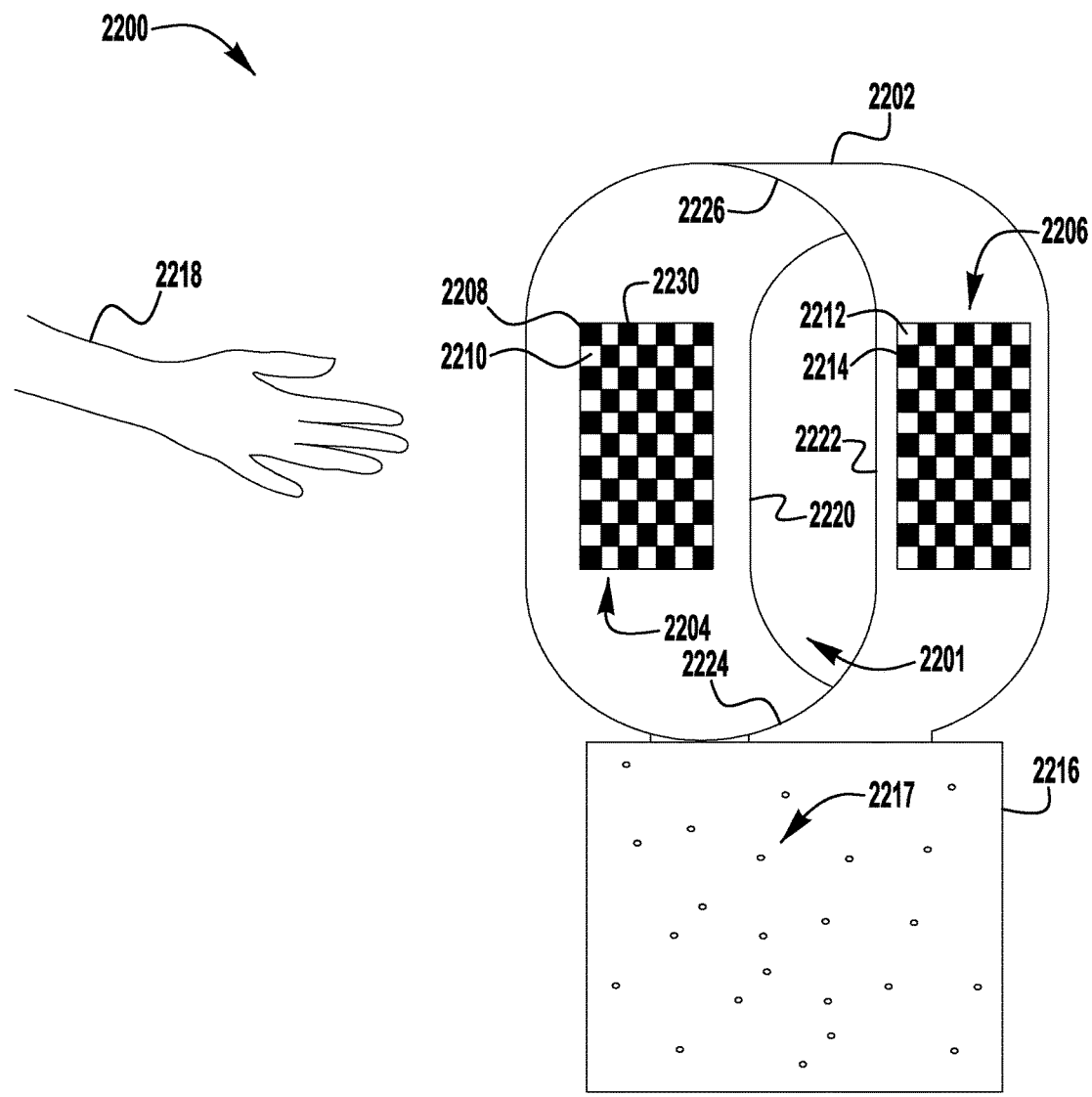
FIG. 16A is an illustration of an exemplary dispenser system for selectively dispensing liquid material.
Figure 16B:
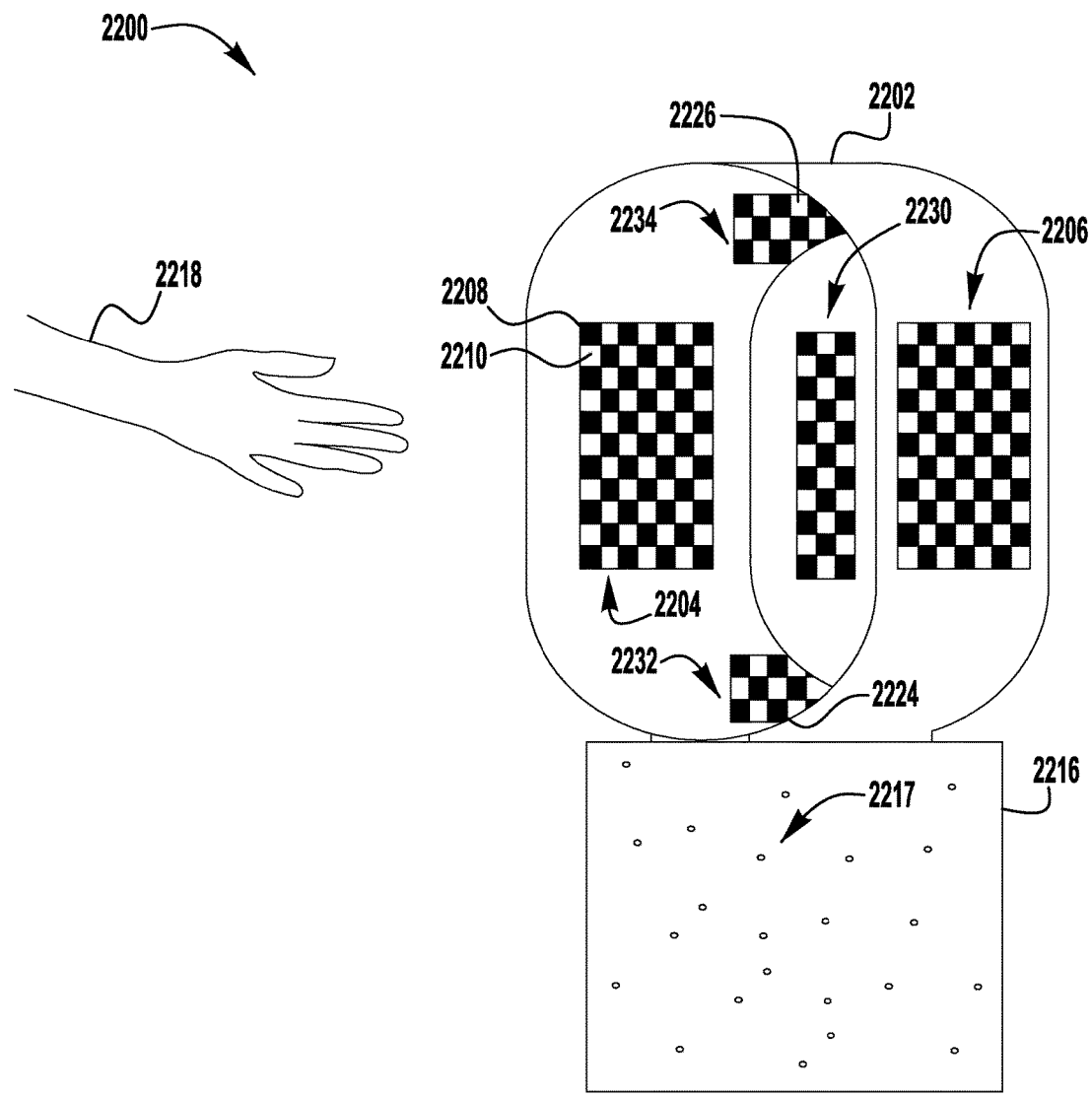
FIG. 16B is an illustration of another exemplary system for selectively dispensing liquid material.

FIGS. 16A-16B illustrate examples of a liquid dispenser 2200. The liquid dispenser 2200 comprises a dispenser housing 2202 having a top side 2226, a bottom side 2224 that is opposed the top side 2226, a first side 2220, and a second side 2222 that is opposite the first side 2220. A dispense zone chamber 2201, into which a user may place an object such as a hand 2218 for selectively receiving liquid material, is defined by the top side 2226, the bottom side 2224, the first side 2220, and the second side 2222. The dispenser housing 2202 is coupled to a liquid reservoir 2216 housing a liquid material 2217. Fluid passageways connect the liquid reservoir 2216 to pump chambers (not shown) configured to hold the liquid material 2217 for dispense events. In addition, the dispenser includes a power source (not shown), such as for example one or more batteries, a controller (not shown), which includes a processor, memory, circuitry and logic, that controls the emitters, and additional hardware and circuitry required to make the dispenser operational.

The liquid dispenser 2200 includes one or more liquid dispenser array components, such as a first liquid dispenser array component 2204 positioned on the first side 2220 of the dispenser housing 2202 and a second liquid dispenser array component 2206 positioned on the second side 2222 of the dispenser housing 2202. In some embodiments, the liquid dispenser 2200 may include a third liquid dispenser array component 2234 positioned on the top side 2226 of the dispenser housing 2202 and a fourth liquid dispenser array component 2232 positioned on the bottom side 2224 of the dispenser housing 2202, as illustrated in FIG. 16B. The first liquid dispenser array component 2204 includes a first array of nozzles 2210 (illustrated as white boxes) such as a first nozzle 2210. The first liquid dispenser array component 2204 includes a first array of detector emitter/sensors 2208 (illustrated as black boxes) such as a first detector emitter/sensor 2208. The second liquid dispenser array component 2206 includes a second array of nozzles 2212 (illustrated as white boxes) such as a second nozzle 2212. The second liquid dispenser array component 2206 includes a second array of detector emitter/sensors 2214 (illustrated as black boxes) such as a second detector emitter/sensor 2214.

The first detector emitter/sensor 2208 may be configured to send a first dispense event signal to a processor (not shown) that causes the first pump to pump the liquid material 2217 from a first pump chamber out of the first nozzle 2210 based upon the first detector emitter/sensor 2208 detecting interrupted emission of a first signal (e.g., the user may place the hand 2218 in the dispense zone chamber 2201 such that the first signal is blocked from reaching the first detector emitter/sensor 2208) emitted by a second emitter/sensor 2214 of the second liquid dispenser array component 2206. In some embodiments, the processor sends the first dispense event signal without a delay. In another example, the processor may send the first dispense event signal to invoke the first pump to perform a series of dispense events until the first signal is redetected (e.g., the liquid material 2217 may be continuously sprayed while the first signal is blocked from being detected by the first detector emitter/sensor 2208).

The processor may be configured to send a second dispense event signal to a second pump to invoke the second pump to pump the liquid material 2217 from a second pump chamber out of the second nozzle 2212 based upon the second detector emitter/sensor 2214 detecting interrupted emission of a signal (e.g., the user may place the hand 2218 in the dispense zone chamber 2201 such that the second signal is blocked from reaching the second detector sensor 2214) emitted by a first emitter/sensor 2208 of the first liquid dispenser array component 2204. In this way, the liquid material 2217 may be selectively dispensed through nozzles onto the hand 2218 in a relatively accurate manner in order to mitigate overspray and/or under spray.

Figure 17:
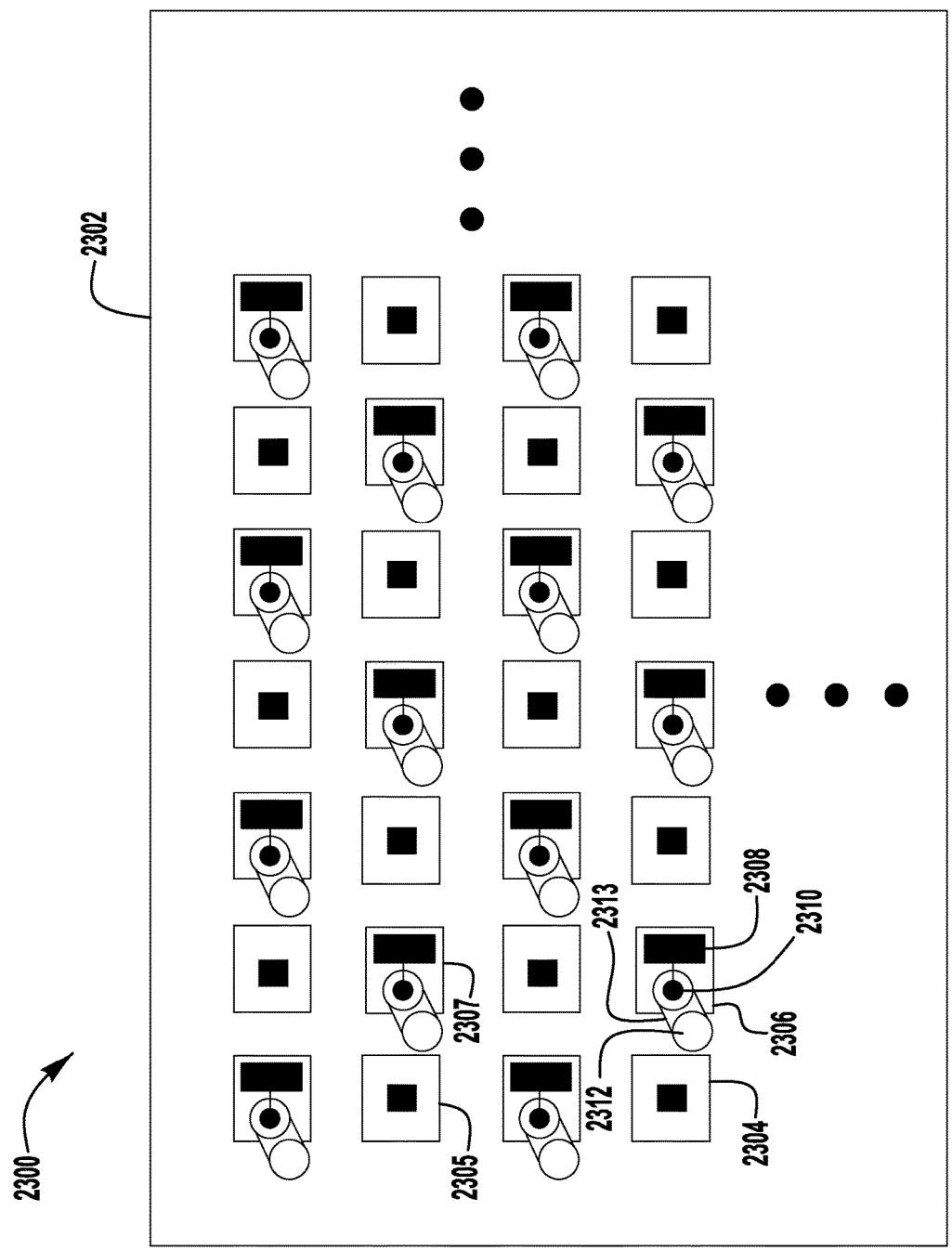
FIG. 17 is an illustration of a portion of an exemplary system for selectively dispensing liquid material.

FIG. 17 illustrates an exemplary embodiment of a liquid dispenser array component 2300 on an assembly 2302. The liquid dispenser array component 2300 includes a plurality of emitter/sensors, for example, a first emitter/sensor 2304, a second emitter/sensor 2305, etc. The liquid dispenser array component 2300 includes a plurality of liquid dispensers, for example, a first liquid dispenser 2306, a second liquid dispenser 2307, etc. The first liquid dispenser 2306 includes a first pump chamber 2313 configured to hold a liquid material. The first pump chamber 2313 is coupled to a first nozzle 2312, such an opening or orifice (e.g., surface tension and/or atmospheric pressure may keep liquid material from flowing out of the first nozzle 2312). The first pump chamber 2313 may be connected by a fluid passageway to a fluid reservoir (not shown) so that liquid material may be received into the first pump chamber 2313.

The first liquid dispenser 2306 includes a pump 2310 configured to perform a dispense event by pushing the liquid material from the first pump chamber 2313 out through the first nozzle 2312. In one embodiment, the first pump includes a diaphragm micro pump (e.g., a piezoelectric pump or other pump on chip/circuit board) that is configured to pump the liquid material from the first pump chamber 2313 through the first nozzle 2312. In one embodiment, the diaphragm micro pump includes an actuator (e.g., a ceramic or other material actuator) and the diaphragm (e.g., a metal, stainless steel, or other material diaphragm) that is vibrated during actuation to create pressure that pushes the liquid material out through the first nozzle 2312 (e.g., surface tension of the first nozzle 2312 and/or a meniscus effect may create a droplet or spray of the liquid material that may project towards an object such as a hand placed within a dispense zone chamber). In some embodiments, a vacuum effect from the pressure and dispense event may draw additional liquid material from the fluid reservoir and fluid passageway into the first pump chamber 2313 for a subsequent dispense event. The dispense event may be triggered based upon a first detector sensor detecting an interrupted emission of a signal (e.g., a broken beam detection event). The first emitter/sensor 2304, and/or the first pump 2310 may be mounted to a circuit board and are in circuit communication with a controller (not shown). In some embodiments, the emitter/sensors are separated from one another.

Figure 18:
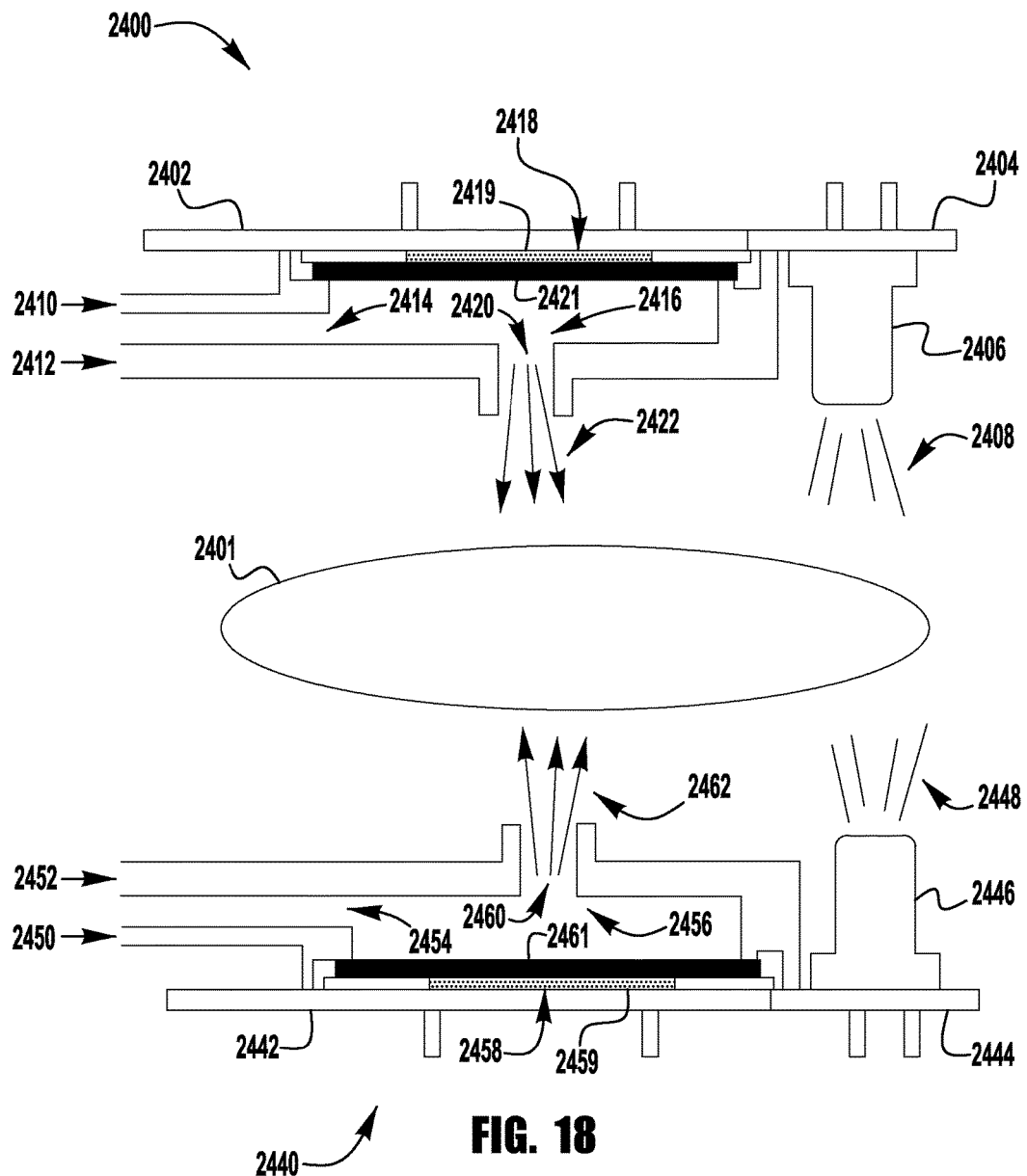
FIG. 18 is an illustration of a portion of an exemplary system for selectively dispensing liquid material.

FIG. 18 illustrates a first liquid dispenser 2400 and a second liquid dispenser 2440 that are positioned opposite sides of a dispenser (not shown). The first liquid dispenser 2400 includes one or more manifold plates, such as a first manifold plate 2410 and a second manifold plate 2412 that are connected together to form a first fluid passageway 2414, from a fluid reservoir that includes a fluid material (e.g., sanitizer, soap, water, medicine), to a first pump chamber 2416. The manifold plates form a first nozzle 2420 (e.g., an opening, an orifice, etc.) coupled to the first pump chamber 2416. The manifold plates are coupled to a first circuit board portion 2402 and/or a second circuit board portion 2404 of a circuit board.

A first diaphragm micro pump 2418, comprising an actuator 2419 and a diaphragm 2421, is coupled to the first circuit board portion 2402. The first diaphragm micro pump 2418 may be positioned between the first circuit board portion 2402 and the first pump chamber 2416, such that the actuator 2419 may activate the diaphragm 2421 causing it to vibrate when it receives a first dispense event signal provided by the controller. The vibration of the diaphragm 2421 causes pressure within the first pump chamber 2416 which expels fluid material 2422 from the first pump chamber 2416 through the first nozzle 2420.

The first liquid dispenser 2400 includes a emitter/sensor 2406, such as an infrared (IR) sensor with an infrared diode that reacts to a signal from a light beam emitted by a second emitter/sensor 2446 of the second liquid dispenser 2440. The sensor 2406 may be coupled to the second circuit board portion 2404. The sensor 2406 is configured to emit and/or receive a signal 2408. In some embodiments, the first detector sensor 2406 may detect interrupted emission (or lack) of the signal 2408, sent from emitter/sensor 2446, because the signal 2408 is blocked by an object 2401, such as a hand. In response to a blocked signal, the controller sends (e.g., after a 1 second delay) a first dispense event signal to the first diaphragm micro pump 2418 for activation of the diaphragm 2421 by the actuator 2419 to dispense fluid.

Similarly, the second liquid dispenser 2440 includes one or more manifold plates, such as a third manifold plate 2450 and a fourth manifold plate 2452 that are connected together to form a second fluid passageway 2454, from the fluid reservoir to a second pump chamber 2456. The manifold plates form a second nozzle 2460 coupled to the second pump chamber 2456. The manifold plates are coupled to a third circuit board portion 2442 and/or a fourth circuit board portion 2444 of a second circuit board.

A second diaphragm micro pump 2458, which includes a second actuator 2459 and a second diaphragm 2461 is coupled to the third circuit board portion 2442. The second diaphragm micro pump 2458 may be positioned between the third circuit board portion 2442 and the second pump chamber 2456, such that the second actuator 2458 may activate the second diaphragm 2461 causing it to vibrate based upon a second dispense event signal provided by the controller. The vibration of the second diaphragm 2461 causes pressure within the second pump chamber 2456 that expels fluid material 2462 from the second pump chamber 2456 through the second nozzle 2460.

The second liquid dispenser 2440 includes a second emitter/sensor 2446 (e.g., the second detector sensor and/or the second emitter/sensor), such as a second IR sensor with a second infrared diode that reacts to a second signal such as a second light beam emitted by the first emitter/sensor of the first liquid dispenser 2400. The second emitter/sensor 2446 may be coupled to the fourth circuit board portion 2444. The second emitter/sensor 2446 is configured to emit and/or receive a second signal 2448. In some embodiments, the second emitter/sensor may detect interrupted emission (or lack of) of the second signal 2448. In response the controller may send (e.g., after a 1 second delay) the second dispense event signal to the second diaphragm micro pump 2458 for activation of the second diaphragm 2461 by the actuator 2459.

Figure 19:
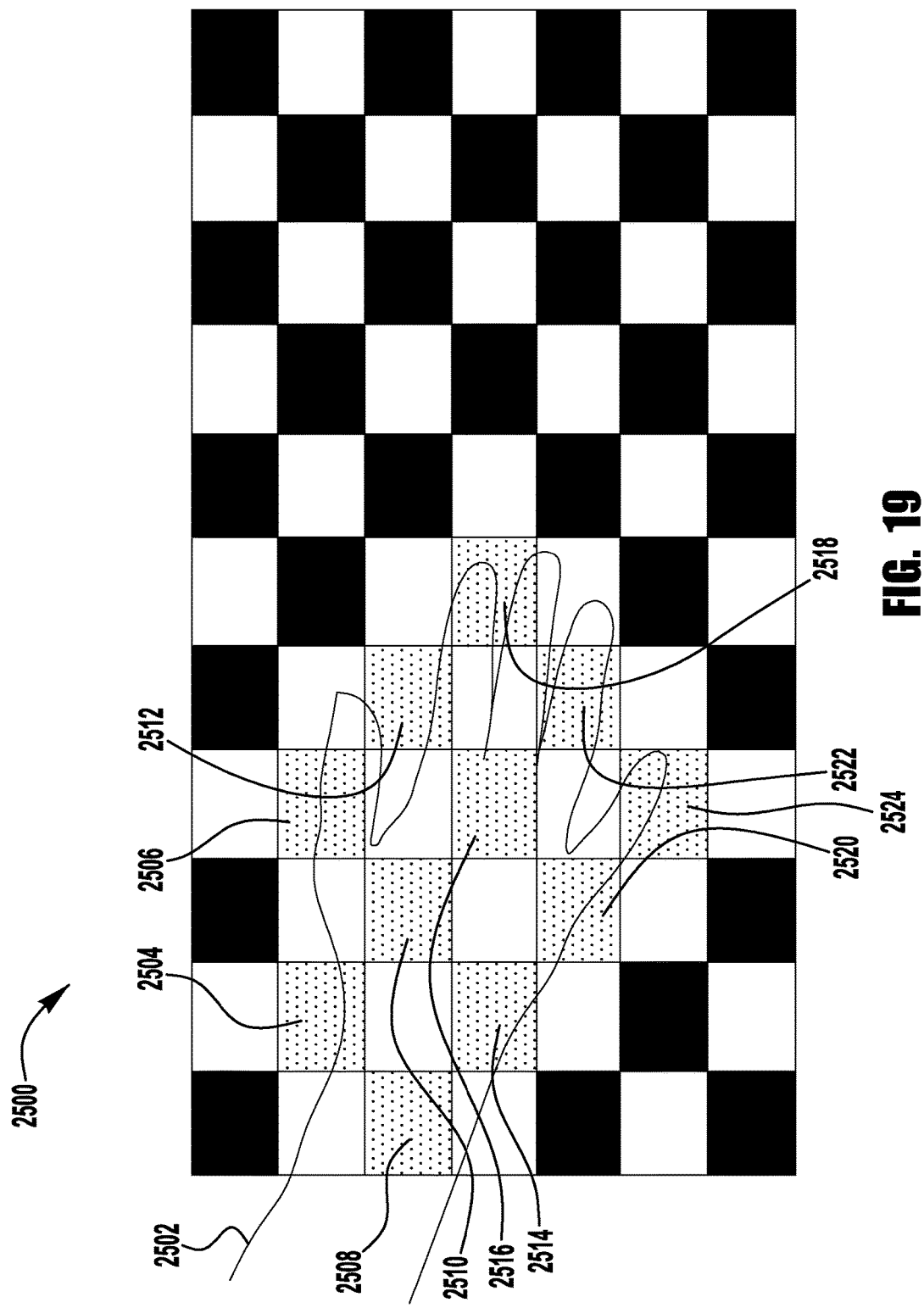
FIG. 19 is an illustration of a portion of an exemplary liquid dispenser selectively dispensing a liquid material.

FIG. 19 illustrates an example of a user placing a hand 2502 into a dispense zone chamber associated with a liquid dispenser component 2500. The liquid dispenser component 2500 comprises an array of liquid dispensers (illustrated as white boxes) and an array of detector emitter/sensors (illustrated as black boxes and spotted boxes). A set of detector emitter/sensors (illustrated as spotted boxes), such as a first detector emitter/sensor 2504, a second detector emitter/sensor 2506, a third detector emitter/sensor 2508, a fourth detector emitter/sensor 2510, a fifth detector emitter/sensor 2512, a sixth detector emitter/sensor 2514, a seventh detector emitter/sensor 2516, an eighth detector emitter/sensor 2518, a ninth detector emitter/sensor 2520, a tenth detector emitter/sensor 2522, and an eleventh detector emitter/sensor 2524, may detect interrupted emission of signals, such as broken beams, emitted from emitter/sensors (not shown) on an opposite side of the dispenser (not shown). Responsive to detecting the interrupted emission, the controller sends dispense event signals to the liquid dispensers that correspond to the emitter/sensors that detected a broken beam to perform dispense events of liquid material towards the hand 2502. In some embodiments, there is a delay, such as after a 1 second delay before the dispense event, so that the user has time to place the hand 2502 fully into the dispense zone chamber. A second set of detector emitter/sensors (illustrated as black boxes) that do not detect the interrupted emission (e.g., but instead continue to detect signals sent by emitter/sensors) do not trigger a dispense event for their corresponding liquid dispensers. In this way, liquid dispensers may be selectively invoked to dispense the liquid material toward the hand 2502.

Figure 20:
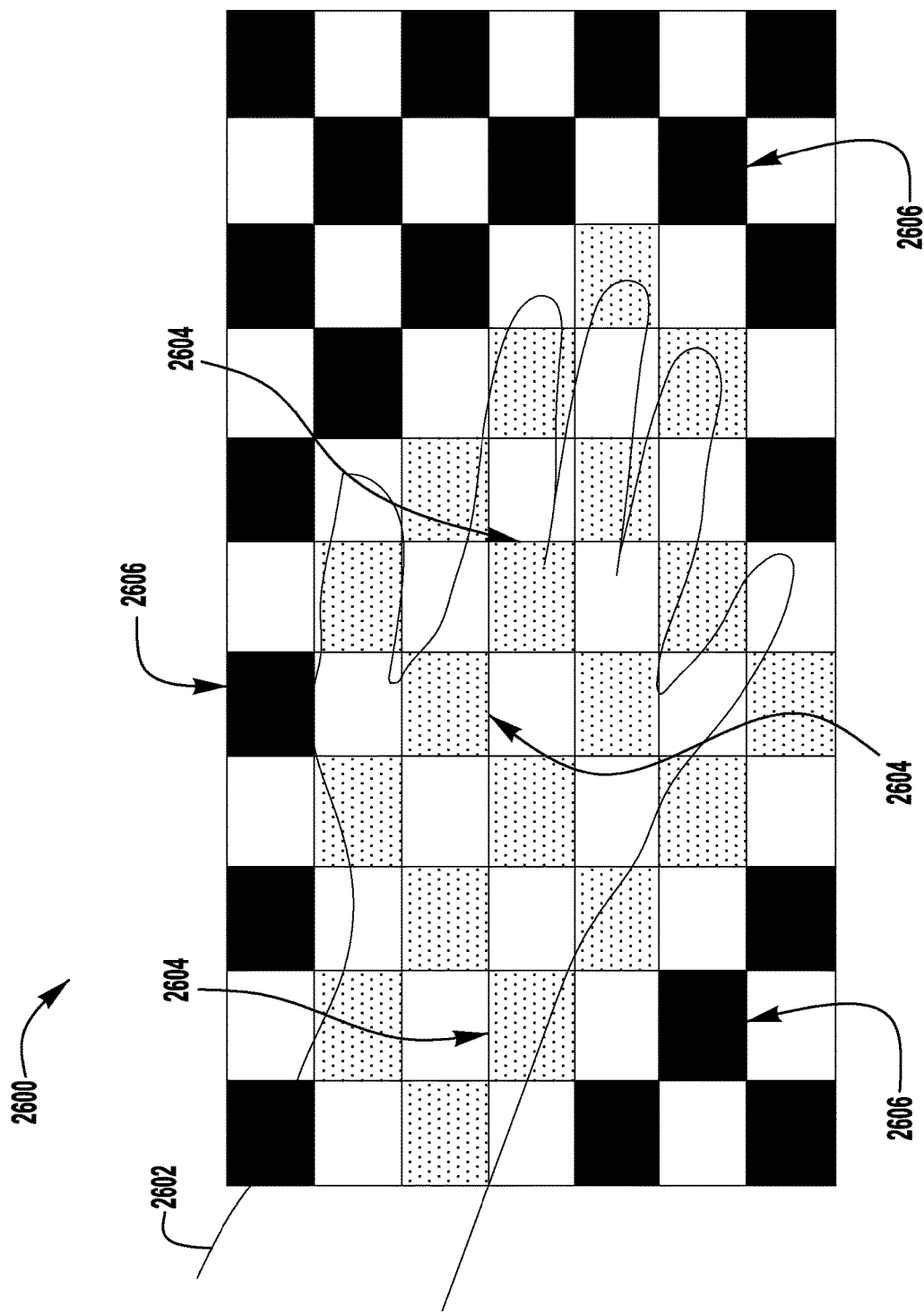
FIG. 20 is an illustration of a portion of an exemplary liquid dispenser selectively dispensing a liquid material.

FIG. 20 illustrates an example of a user placing a hand 2602 into a dispense zone chamber associated with a liquid dispenser component 2600. The liquid dispenser component 2600 comprises an array of liquid dispensers (illustrated as white boxes) and an array of detector emitter/sensors (illustrated as black boxes and spotted boxes). A set of detector emitter/sensors 2604 (illustrated as spotted boxes) may detect interrupted emission of signals, such as broken beams, emitted from emitter/sensors (not illustrated). Responsive to detecting the interrupted emission, the controller may send dispense event signals to corresponding liquid dispensers to perform dispense events of liquid material towards the hand 2602. A second set of detector emitter/sensors 2606 (illustrated as black boxes) that do not detect the interrupted emission (e.g., but instead continue to detect signals sent by emitter/sensors) do not trigger dispense events. In this way, liquid dispensers may be selectively invoked to dispense the liquid material toward the hand 2602.

Figure 21:
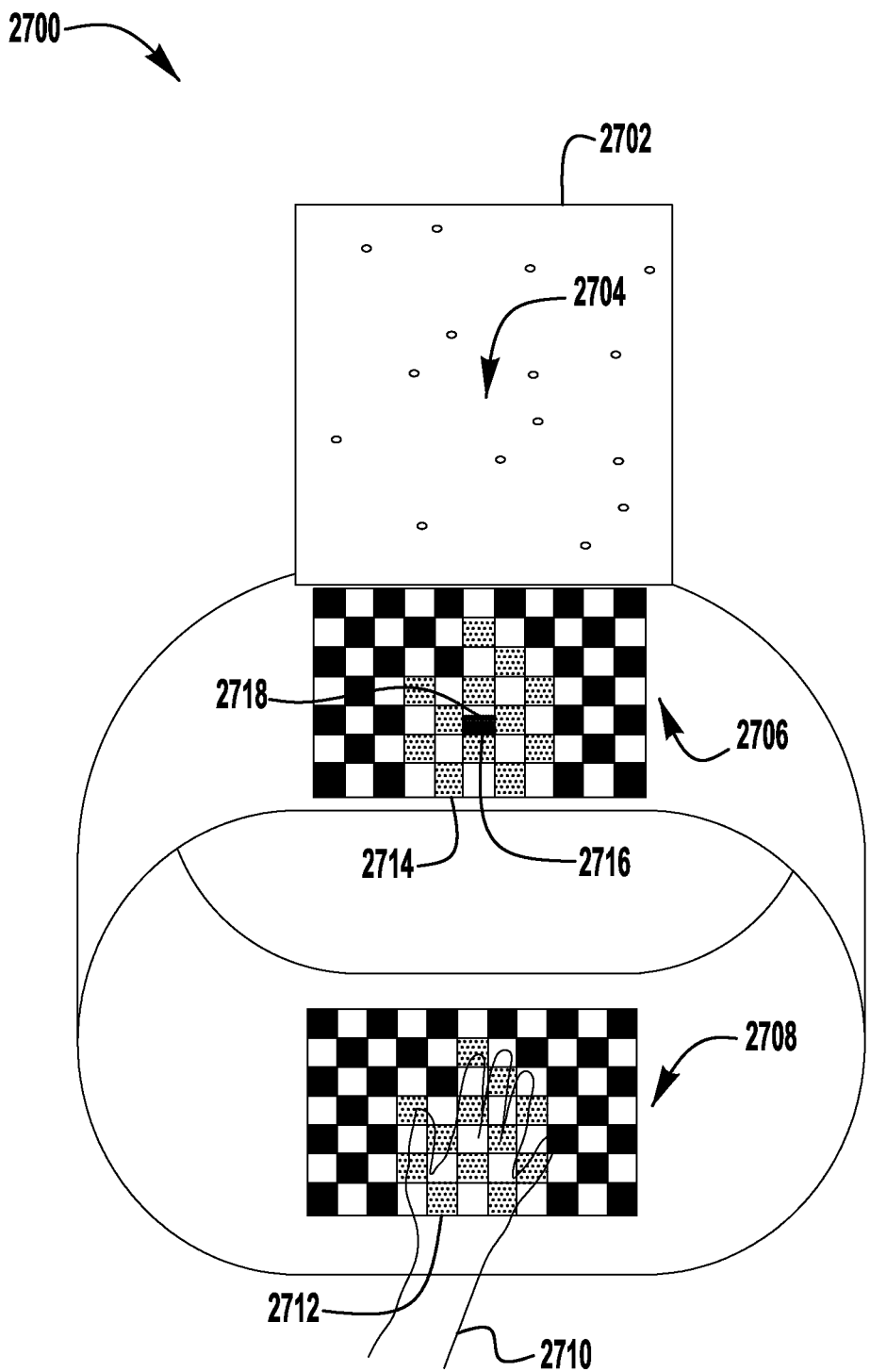
FIG. 21 is an illustration of an exemplary liquid dispenser selectively dispensing a liquid material.
Figure 22:
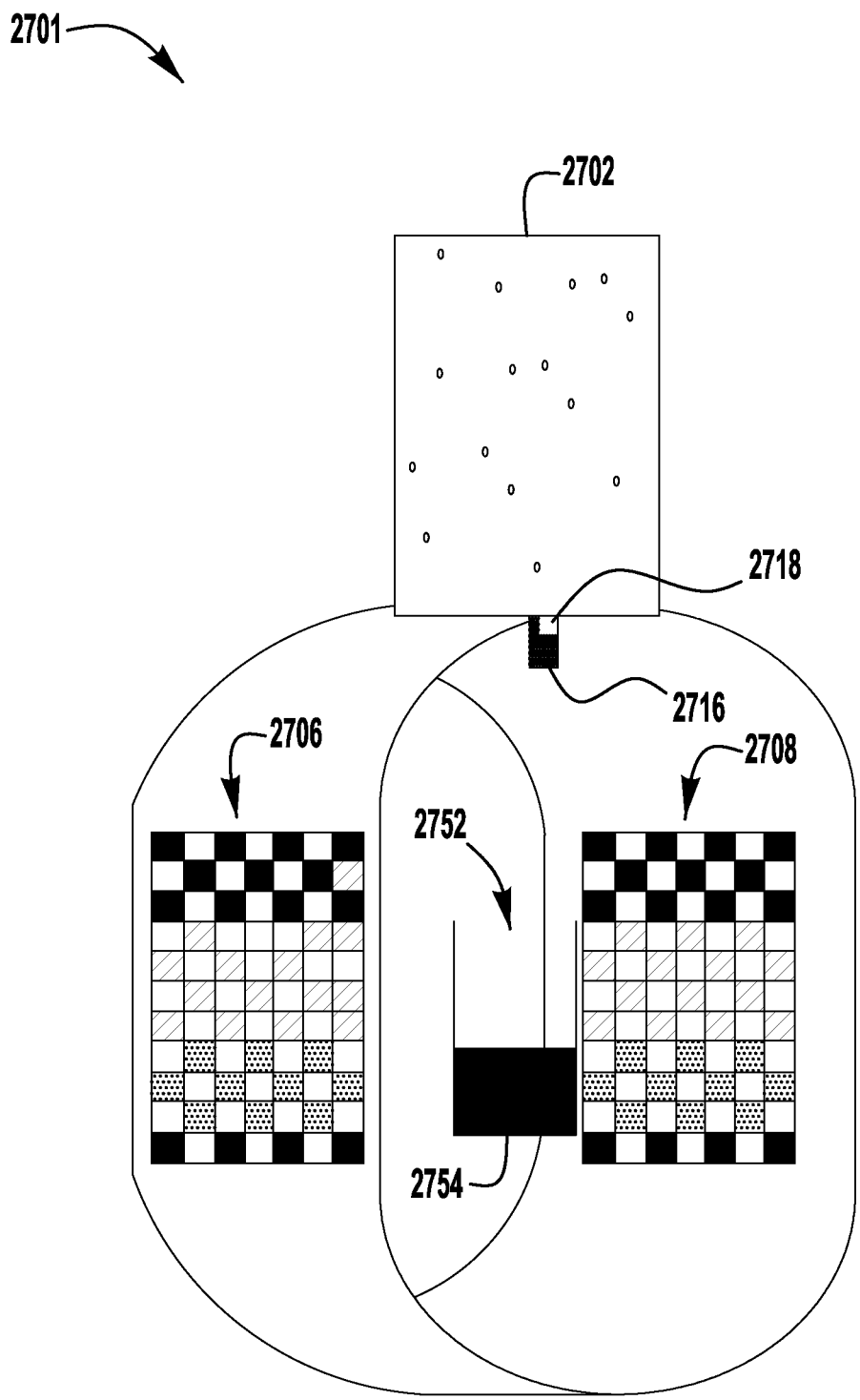
FIG. 22 is an illustration of an exemplary liquid dispenser selectively dispensing a liquid material.

FIGS. 21 and 22 illustrate an additional exemplary embodiment of a liquid dispenser 2700 for dispensing a particular amount of liquid material based upon detection of an object, such as a hand (e.g., a dispense event of sanitizer based upon a size and position of a user's hand). The liquid dispenser component 2700 includes a liquid reservoir 2702 configured to hold a liquid material 2704. The liquid reservoir 2702 is connected, such as by a fluid passageway, to a pump 2716 and nozzle of the liquid dispenser component 2700.

The liquid dispenser 2700 includes an emitter/sensor array 2708 that includes a plurality of emitter/sensors configured to emit signals towards a detector sensor array 2706. The liquid dispenser component 2700 comprises the detector sensor array 2706 that includes a plurality of detector sensors configured to detect interrupted emission (or lack) of signals from the emitter/sensor array 2708.

An object 2710, such as a hand, may be placed within a dispense zone chamber of the liquid dispenser 2700 (e.g., a portion of the liquid dispenser 2700 that is between the emitter/sensor array 2708 and the detector sensor array 2706). The liquid dispenser 2700 includes a a controller (not shown) configured to determine a count of detector sensors that detect interrupted emission of signals from the emitter/sensor array 2708. For example, the object 2710 may block the emission of signals that are emitted from 12 emitter/sensors (illustrated as spotted boxes) towards 12 detector sensors (illustrated as spotted boxes). The object 2710 may not block emission of signals from other emitter/sensors (illustrated as black boxes) emitted towards other detector sensors (illustrated as black boxes).

The controller is configured to determine a dispense amount of liquid material to dispense based upon the count. For example, the controller may determine an amount of sanitizer to dispense into the hand based upon a size and/or position of the hand as determined by the controller based upon the count and position of the 12 detector sensors detecting interrupted emission of signals from the 12 emitter/sensors. Accordingly, the controller may invoke the pump 2716 to perform a dispense event of the liquid material according the dispense amount. In some embodiments, the pump activation component 2718 may invoke the pump 2716 to perform the dispense event after a delay (e.g., a delay of ¼ of a second or more after an initial detection of an interrupted emission).

FIG. 22 illustrates another exemplary embodiment of a liquid dispenser 2701. The liquid dispenser component 2701 includes a pump 2716 and the nozzle 2718 positioned on a top surface of the liquid dispenser 2700, a emitter/sensor array 2708 is attached to a first side surface of the liquid dispenser 2700, and a detector sensor array 2706 is attached to a second side surface of the liquid dispenser component 2700. An object 2752 may be placed within a dispense zone chamber of the liquid dispenser component 2701 (e.g., a portion of the liquid dispenser component 2701 that is between the emitter/sensor array 2708 and the detector sensor array 2706 and that is underneath the pump 2716 and the nozzle).

The pump activation component 2718 is configured to determine a count of detector sensors that detect interrupted emission and/or modified emission of signals from the emitter/sensor array 2708. For example, the object 2752, such as material 2754 within object 2752, may block the emission of signals that are emitted from 10 emitter/sensors (illustrated as spotted boxes) towards 10 detector sensors (illustrated as spotted boxes). The object 2752 may not block emission of signals from other emitter/sensors (illustrated as black boxes) emitted towards other detector sensors (illustrated as black boxes).

In embodiments where the object 2752 is partially transparent, the object 2752 may not completely block emission of signals from 14 emitter/sensors (illustrated as diagonal striped boxes) emitted towards 14 detector sensors (illustrated as diagonal striped boxes), but may merely modify a strength or other characteristic of such signals that travel through an empty portion of the object 2752. Thus, the pump activation component 2718 may identify the empty portion of the object 2752 (e.g., a portion of the object 2752 that does not comprise the material 2754, such as a partially transparent portion that alters the strength or other characteristic of signals) and/or a filled portion of the container 2752 (e.g., a portion of the container 2752 comprising the material 2754 that may completely block the emission of signals) based upon the count and position of the 10 detector sensors (illustrated as spotted boxes) detecting interrupted emission of signals from the 10 emitter/sensors and/or the 14 detector sensors (illustrated as diagonal stripped boxes) that detect modified emission of signals from the 14 emitter/sensors emitting signals passing through the partially transparent portion of the container 2752.

The pump activation component 2718 may determine a dispense amount of liquid material based upon the size and/or position of the 10 detector sensors and/or the 14 detector sensors. Accordingly, the pump activation component 2718 may invoke the pump 2716 to perform a dispense event of the liquid material into or onto the object 2752 according the dispense amount.

The use of sensors and emitters are not limited to the positions and layouts described herein. In some embodiments, the emitters and sensors are separate components. In some embodiments, the emitters and sensors are integrated components and are capable of either emitting a signal or receiving a signal. In some embodiments all of the emitters are on one side and the sensors are on the other side. In some embodiments, emitters and sensors are on both sides. In some embodiments, beams from the emitters are directed at a selected sensor. In some embodiments, multiple sensors receive beams of light from a single emitter. In some embodiments, the emitters and sensors are arranged or placed to maximize the accuracy and minimize the number of sensors and emitters required.

Figure 23:
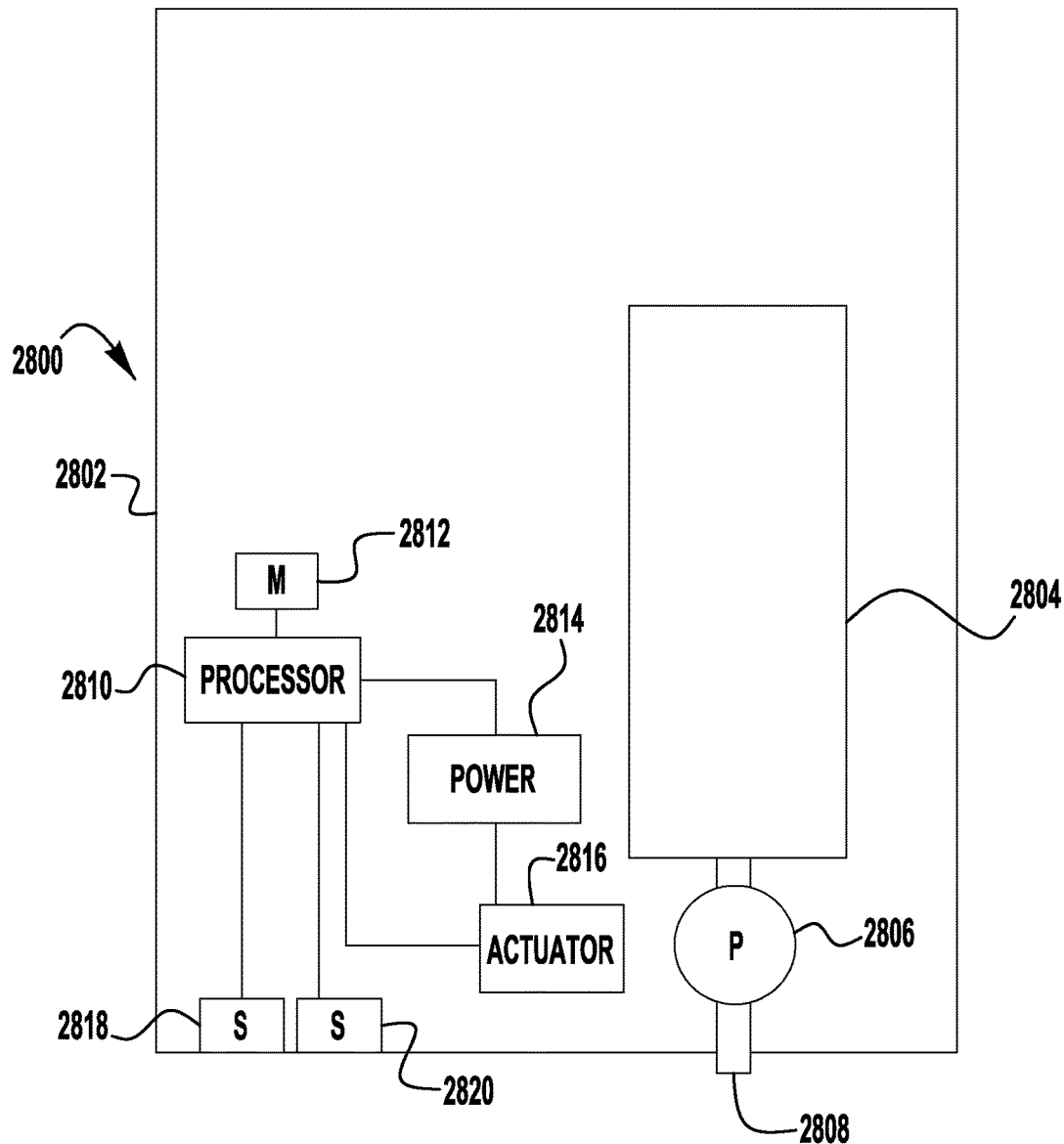
FIG. 23 is a schematic diagram of an exemplary embodiment of a dispenser for dispensing a dose of fluid, wherein the volume of fluid is based on a sensed parameter.
Figure 24B:
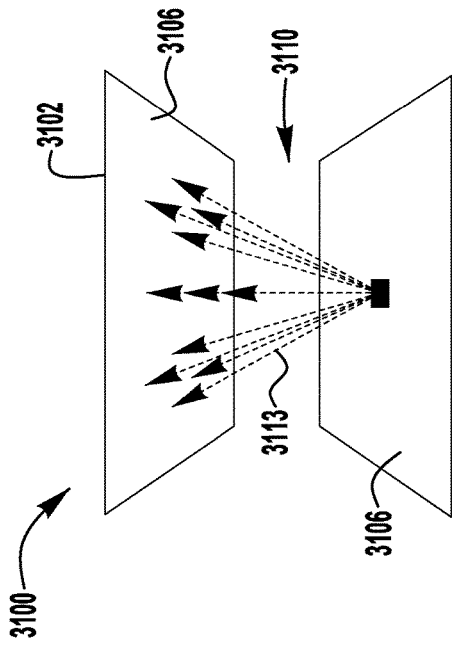
FIGS. 24A-24D illustrate an exemplary sensor for a dispenser that detects a parameter indicative of the size of an object.
Figure 24D:
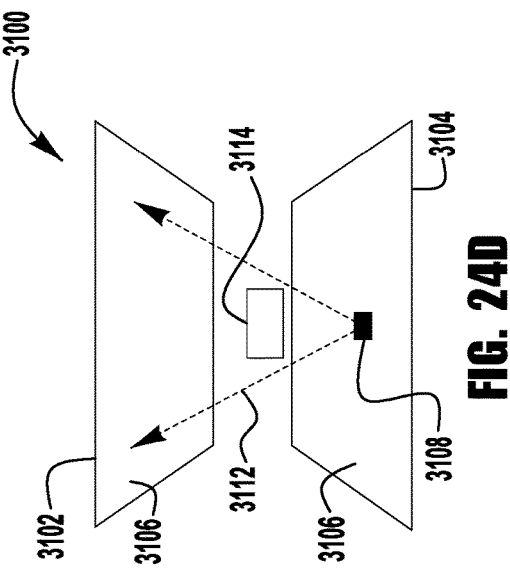
Figure 24A:
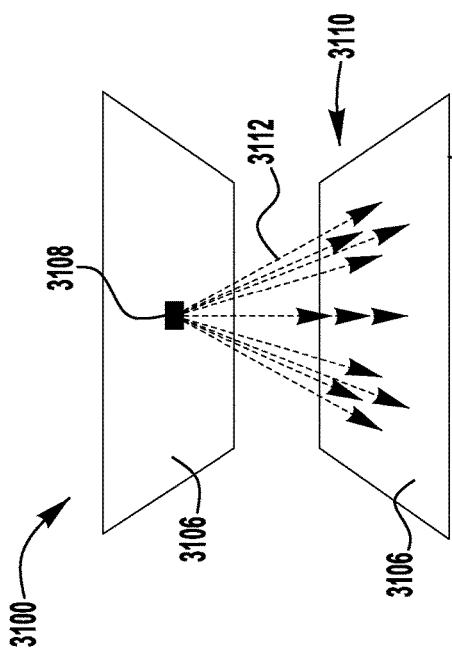
Figure 24C:
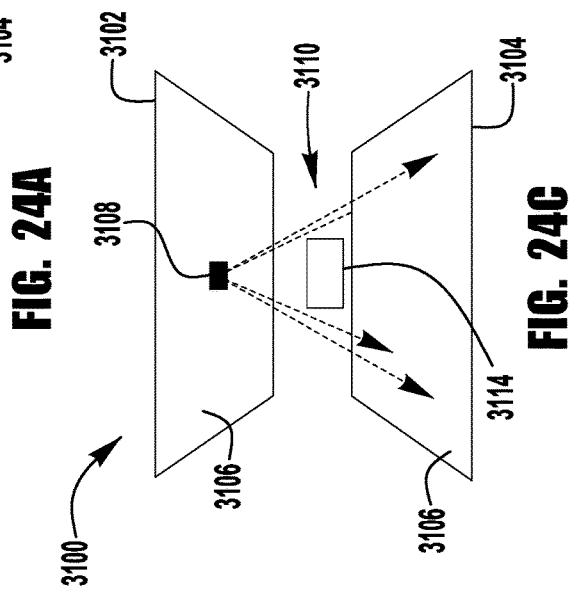

FIG. 23 is a schematic diagram of an exemplary dispenser 2800 for dispensing a dose of fluid, wherein the volume of the dose of fluid is based on a sensed parameter indicative of hand size. Dispenser 2800 includes a housing 2802. Located within the housing 2802 is a container 2804 that holds a fluid to be dispensed, a pump 2806 and an outlet nozzle 2808. In some embodiments container 2804 is removable and replaceable so that it can be replaced when it is empty. In such an embodiment, the container 2804 may be referred to as a refill unit. In some embodiments the container 2804 is connected to the pump 2806 and nozzle 2808 and the container 2804, pump 2806 and nozzle 2808 are removable and replaceable so that they can be replaced when the container is empty. In such an embodiment, the pump 2806 and nozzle 2808 and the container 2804 form a refill unit.

Dispenser 2800 includes an actuator 2816 for actuating pump 2806 to dispense fluid. Actuator 2816 is in circuit communication with a power source 2814 and processor 2810. Power source 2814 may be any power source, such as, for example, one or more batteries. Processor 2810 is in circuit communication with power source 2814, memory 2812, first sensor 2818 and second sensor 2820. This exemplary embodiment discloses two sensors 2818, 2820, however, more or fewer sensors may be used in the exemplary embodiments. In some embodiments memory 2812 includes one or more databases. In some embodiments, the databases are used to correlate a plurality of dispense volume sizes with one or more sensed parameters that are indicative of a hand size.

Although the electrical components may be described as being in certain locations, or as being part of an "electronics package," the components may be located in any suitable location and more or less components may be included. The term electronics package is merely used for convenience and is not meant to limit the number of components or their location.

"Circuit communication" as used herein indicates a communicative relationship between devices. Direct electrical, electromagnetic and optical connections and indirect electrical, electromagnetic and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers or satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, such as, for example, a CPU, are in circuit communication.

Also, as used herein, voltages and values representing digitized voltages are considered to be equivalent for the purposes of this application, and thus the term "voltage" as used herein refers to either a signal, or a value in a processor representing a signal, or a value in a processor determined from a value representing a signal.

"Signal", as used herein includes, but is not limited to one or more electrical signals, analog or digital signals, one or more computer instructions, a bit or bit stream, or the like.

"Logic," synonymous with "circuit" as used herein includes, but is not limited to hardware, firmware, software and/or combinations of each to perform a function(s) or an action(s). For example, based on a desired application or needs, logic may include a software controlled microprocessor or microcontroller, discrete logic, such as an application specific integrated circuit (ASIC) or other programmed logic device. Logic may also be fully embodied as software. The circuits identified and described herein may have many different configurations to perform the desired functions.

The values identified in the detailed description are exemplary and they are determined as needed for a particular dispenser and/or refill design. Accordingly, the inventive concepts disclosed and claimed herein are not limited to the particular values or ranges of values used to describe the embodiments disclosed herein.

In this exemplary embodiment, sensor 2818 detects an object, such as a hand, when it is below the dispenser 2800. When sensor 2818 detects an object below the dispenser, a signal is sent to processor 2810. Processor 2810 causes sensor 2820 to sense a parameter of the object. The sensed parameter is indicative of the size of the object. If the object is a hand, the sensed parameter may be any parameter of the hand or portion of the hand that can be used to indicate the size of the hand, such as, for example, the size of the palm, the width of the hand, the thickness of the hand, the length of the hand, the length of one or more fingers, the thickness of one or more fingers, the surface area of the hand, the perimeter of the hand, and the like. Sensor 2820 may be any sensor that can detect one or more of the parameters, such as the image capturing device or other devices described above, or the exemplary sensors described in detail below.

Sensor 2820 sends a signal to processor 2810. The processor 2810 calculates a volume dose size and sends a signal to actuator 2816. Based on the calculated dose size, the actuator 2816 operates the pump 2806 in a way to dispense the proper dose size of fluid. The dose sizes may be an infinite number of dose sizes that are directly proportional to the sensed parameter. In some embodiments, there are a finite number of dose sizes stored in memory 2812, such as, for example, small, medium, large. In such embodiments, the processor 2810 receives the signal from sensor 2820 and determines which preselected dose size, small, medium, or large, to dispense. In some embodiments, only two dose sizes are used, e.g. small and large.

Pump 2806 may be any type of pump capable of dispensing multiple size doses as described above. In some embodiments, only one sensor is used and, for example, sensor 2820 also detects when an object or hand is present under the dispenser. Additional exemplary embodiments of various sensors that sense a parameter indicative of hand size are disclosed below.

FIGS. 24A-24D illustrate an exemplary sensor 3100 for a dispenser that that detects a parameter indicative of the size of an object 3114 (such as a hand). Any dispenser disclosed in the present application may incorporate the sensor 3100. The exemplary sensor includes a first array 3102 and a second array 3104. Each array 3102 and 3104 includes a plurality of receivers 3106 (although no specific receiver is illustrated, the receivers 3106 are arranged in a planar array, such as, for example, a 10×10 array, or any other dimensional array) and an emitter 3108. The emitter 3108 is configured to emit a signal on each receiver in the array when there is no object in the sensing area. Optionally, multiple emitters 3108 may be used. In some embodiments, the receivers are infrared (IR) receivers. In some embodiments, the emitters are wide angle IR emitters. FIGS. 23A-23B illustrate the sensor 3100 without an object 3114 in the sensing zone 3110. Referring to FIG. 23A, the emitter 3108 of the first array 3102 is activated, which provides a signal 3112 to the second array 3104, and the receivers 3106 of the second array 3104 detect the signal 3112 from the emitter 3108. Referring to FIG. 23B, the emitter 3108 of the second array 3104 is activated, which provides a signal 3113 to the first array 3102, and the receivers 3106 of the first array 3102 detect the signal 3113 from the emitter 3108. Because all receivers 3106 received signals, the processor 2810 can determine that no object or hand is present in the sensing zone.

FIGS. 23C-23D illustrate the sensor 3100 with an object 3114 in the sensing zone 3110. Referring to FIG. 23C, the emitter 3108 of the first array 3102 is activated, which provides a signal 3112 to the second array 3104, and the receivers 3106 of the second array 3104 detect the signal 3112 from the emitter 3108. However, the object 3114 obstructs the signal 3112 and prevents some of the receivers 3106 of the second array 3104 from detecting the signal 3112.

Based on the signals received by the process or from second array 3104, the processor calculates a first measurement. The first measurement may be determined based on the which receivers 3106 in the array 3104 received or did not receive the signal 3112.

Referring to FIG. 23D, the emitter 3108 of the second array 3104 is activated, which provides a signal 3113 to the first array 3102, and the receivers 3106 of the first array 3102 detect the signal 3112 from the emitter 3108. However, the object 3114 obstructs the signal 3113 preventing some of the receivers 3106 of the second array 3104 from detecting the signal 3112.

Based on the signals received by the process or from first array 3102, the processor calculates a second measurement. The second measurement may be determined based on the which receivers 3106 in the array received or did not receive the signal 3114.

If the location of the hand 3114 is closer to the first array 3102 than the second array 3104 the first measurement will be greater than the second measurement. Similarly, if the location of the hand 3114 is closer to the second array 3104 than it is to the first array 3102 then the second measurement will be greater than the first measurement. In order to correct for this phenomena, processor 2810 averages the first measurement and the second measurement to determine a size of the hand 3114. The processor uses the calculated size of the hand 3114 to determine the appropriate volume of fluid to be dispensed and sends a signal to the actuator 2816 to dispense that volume of fluid.

Figure 25:
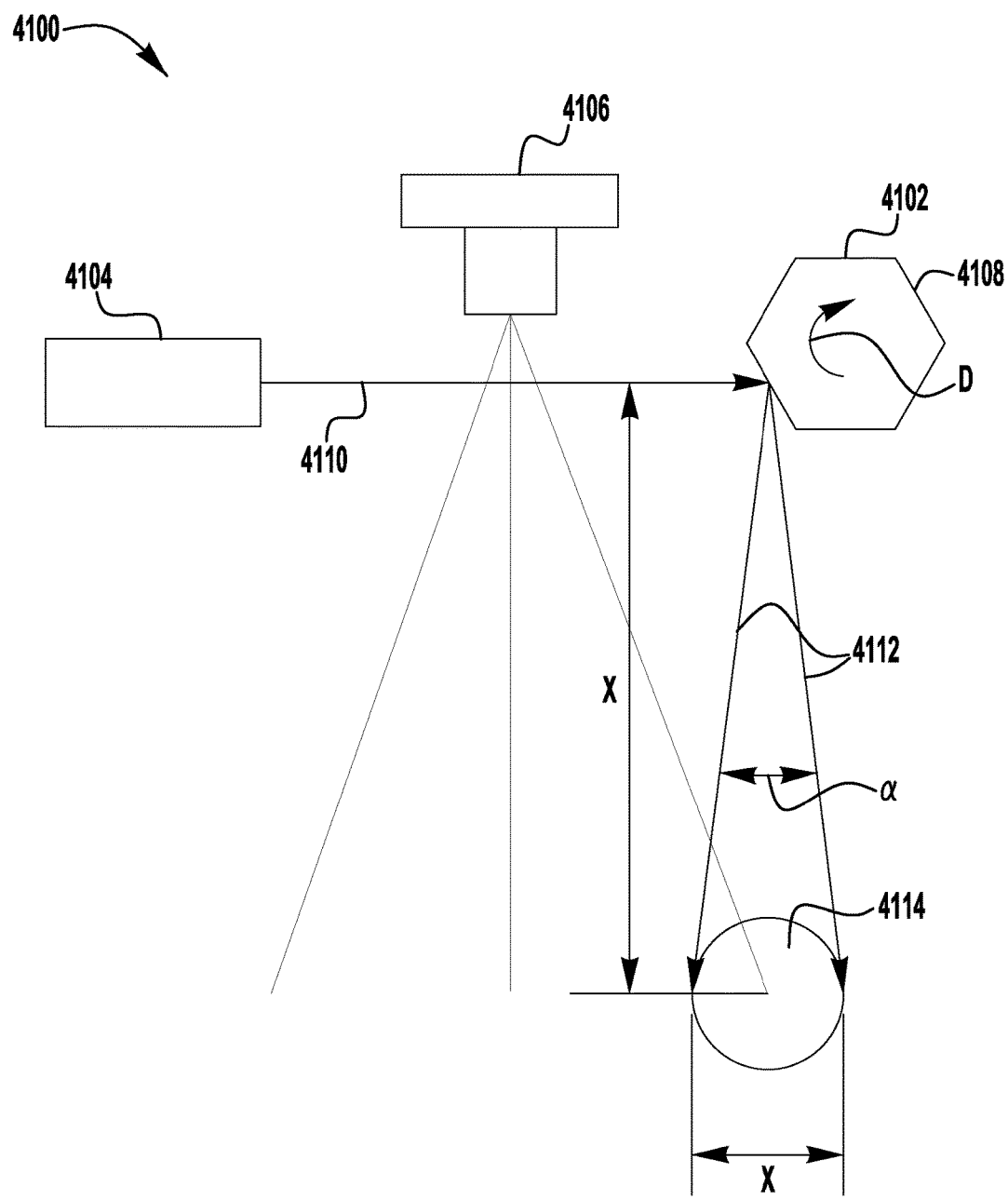
FIG. 25 illustrates another exemplary sensing system for a dispenser that detects a parameter indicative of the size of an object.

FIG. 25 illustrates another exemplary sensor 4100 for a dispenser that detects a parameter indicative of the size of an object 4114 (such as a hand). Any dispenser disclosed in the present application may incorporate the sensor 4100. Sensor 4100 is a laser based sensor. The sensor 4100 includes an optics device 4102, a laser 4104, and a sensor 4106. In certain embodiments, the optics device 4102 may have a polygonal shape with multiple reflecting faces 4108. In some embodiments, the optics device 4102 rotates in a clockwise direction D, as shown in the illustrated embodiment, at a known speed. In another embodiment, the optics device 4102 rotates in a counterclockwise direction at a known speed. The laser 4104 emits a beam 4110 that reflects off of a reflective face 4108 of the optics device 4102 and is directed toward object 4114. The reflected beam 4112 is scanned across an object 4114 and is reflected toward sensor 4106. Sensor 4106 detects the reflected light from the object 4114. An angle α is determined by the speed of the optics device 4102 and the amount of time in which the sensor 4106 detects the reflected light from the object 4114. The distance Y is determined by time of flight of the laser beam. Processor 2810 determines the distance X across object 4114 based on the angle α and the distance Y. Once processor 2810 determines the distance X across object 4114 the processor determines a volume of fluid to be dispensed. Distance X may represent any distance that is indicative of the size of an object, such as a hand. In some embodiments, distance X represents the width of a hand, in some embodiments distance X represents the length of the hand, in some embodiments, multiple measurements are made and the processor determines both the width and length of the hand.

Figure 26:
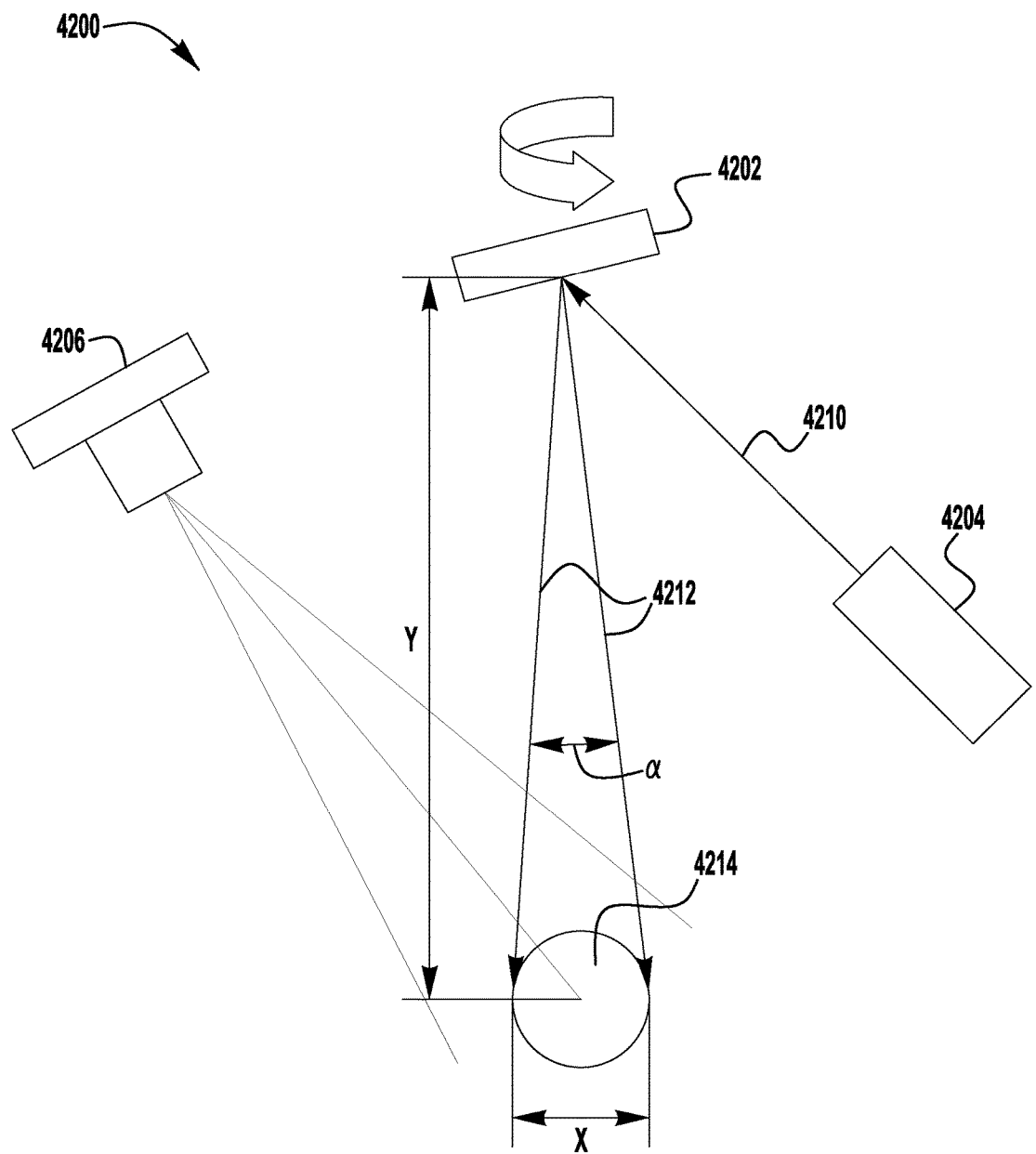
FIG. 26 illustrates another exemplary sensing system for a dispenser that detects a parameter indicative of the size of an object.

FIG. 26 illustrates another exemplary laser based sensor 4200 for a dispenser that detects a parameter indicative of the size of an object 4214 (such as a hand). Any dispenser disclosed in the present application may incorporate the sensor 4200. The sensor 4200 includes an optics device 4202, a laser 4204, and a sensor 4206. In one embodiment, the optics device 4202 oscillates. The laser 4204 emits a beam 4210 that reflects off of the oscillating optics device 4202, and a reflected beam 4212 scans across an object 4214. The sensor 4206 detects light reflected from the object 4214.

The distance Y is determined by time of flight of the laser beam. Processor 2810 determines the distance X across object 4214 based on the angle α and the distance Y. Once processor 2810 determines the distance X across object 4214 the processor 2810 determines a volume of fluid to be dispensed. Distance X may represent any distance that is indicative of the size of an object, such as a hand. In some embodiments, distance X represents the width of a hand, in some embodiments distance X represents the length of the hand, in some embodiments, multiple measurements are made and the processor determines both the width and length of the hand.

Figure 27:
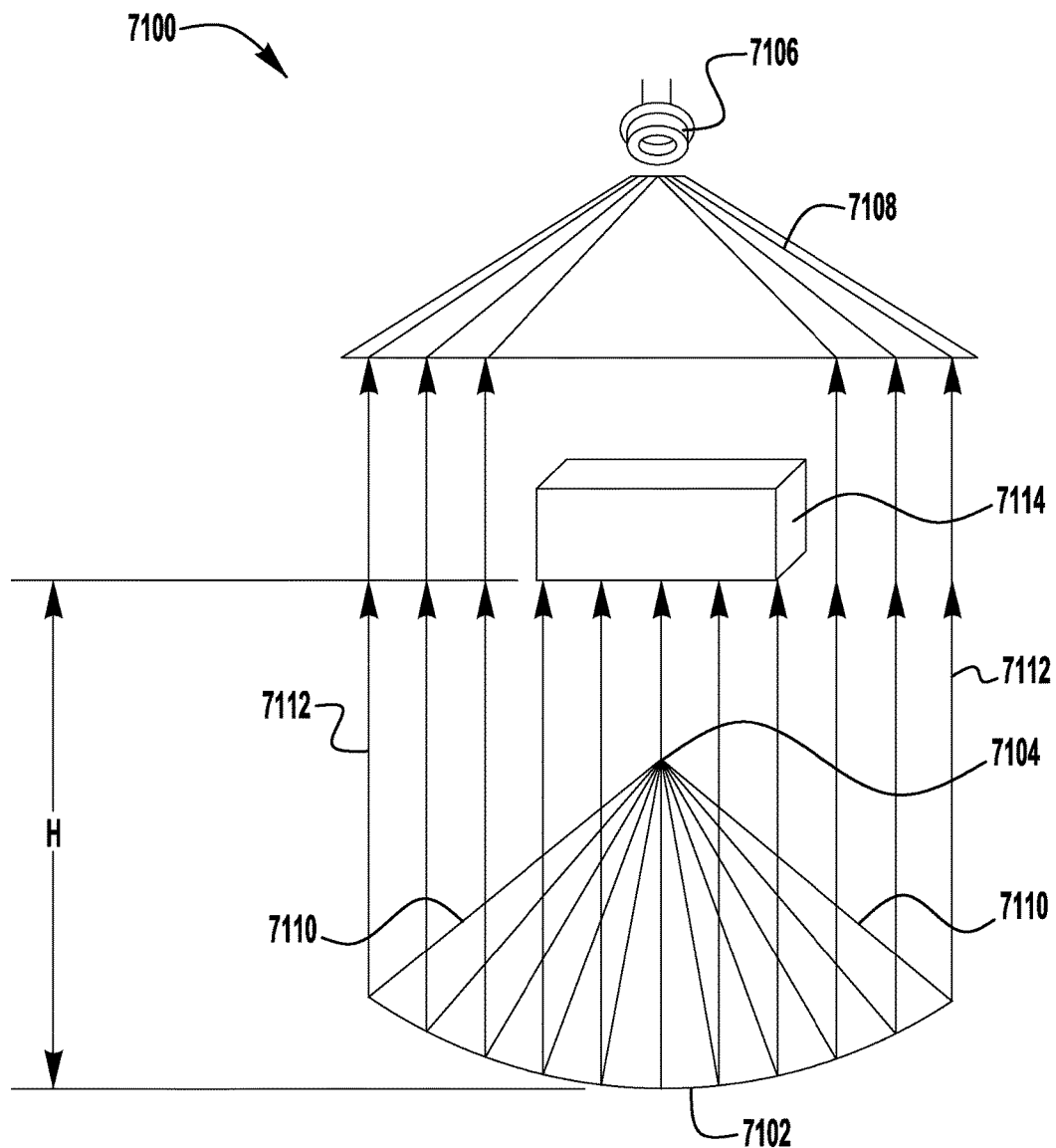
FIG. 27 illustrates another exemplary sensing system for a dispenser that detects a parameter indicative of the size of an object.

FIG. 27 illustrates another exemplary sensor 7100 for a dispenser that detects a parameter indicative of the size of an object 7114 (such as a hand). Any dispenser disclosed in the present application may incorporate the sensor 7100. The sensor 7100 includes a reflecting surface 7102, a light source 7104, a light pipe 7108, and a sensor 7106. The light source 7104 emits light beams 7110 in the direction of the reflecting surface 7102, and the reflecting surface 7102 is configured to direct reflected beams 7112 in substantially parallel paths toward the light pipe 7108. The light pipe 7108 receives the reflected beams 7112 and directs the reflected beams to the sensor 7106. In the illustrated embodiment, the light source 7104 is located in substantially centrally above the reflecting surface 7102 and the reflecting surface 7102 has a parabolic shape. Many variations of the light source 7104 and shape of the reflecting surface 7102 may used provided that the path of the reflected beams 7112 is substantially parallel from the reflecting surface 7102 to the light pipe 7108. The substantially parallel path of the reflected beams 7112 renders the sensor 7100 insensitive to height H of the object 7114. When an object 7114 is placed in the sensor 7100, the object 7114 blocks some of the reflected beams 7112 from reaching the light pipe 7108. The sensor detects the amount of reflected beams 7112 that reach the light pipe 7108 and sends the signal to processor 2810 indicative of the amount of light received by the sensor. Processor 2810 determines one or more parameters of the object 7114 based on the amount of light and calculates a volume of fluid to be dispensed based on the one or more parameters. In some embodiments, the one or more parameters may be one of, for example, hand width, hand length, hand thickness, palm length, palm width, finger length, finger width, finger thickness, combinations thereof and the like.

Figure 28:
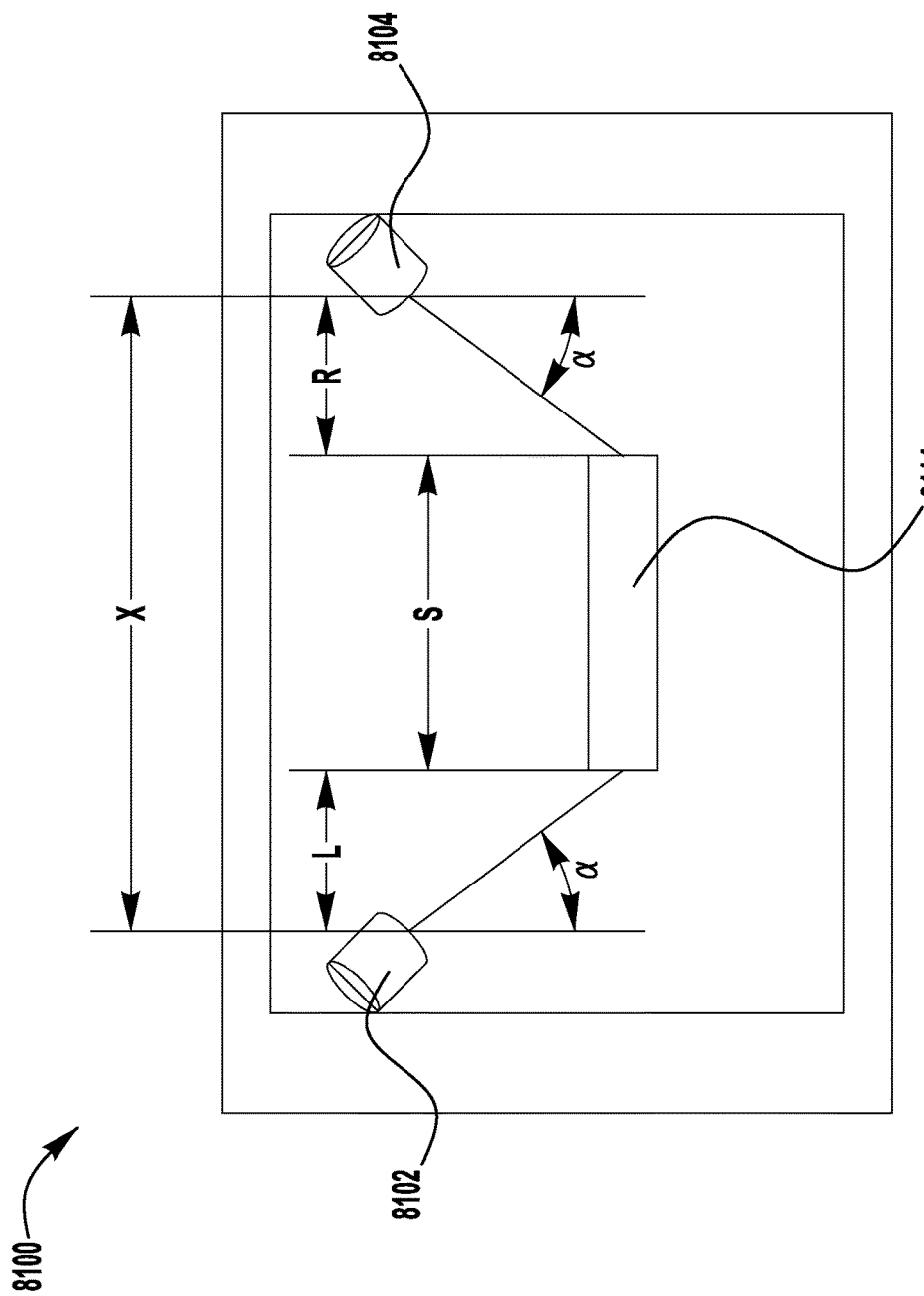
FIG. 28 illustrates another exemplary sensing system for a dispenser that detects a parameter indicative of the size of an object.

FIG. 28 illustrates another exemplary sensor 8100 for a dispenser that detects a parameter indicative of the size of an object 8114 (such as a hand). Any dispenser disclosed in the present application may incorporate the sensor 8100. The sensor 8100 includes a first sensor/emitter 8102 and a second sensor/emitter 8104. The sensors/emitters 8102, 8104 may be, for example, sonar, radar, infrared, ultrasonic, or the like. The first sensor/emitter 8102 and the second sensor/emitter 8104 are separated by a known distance X, and angled at a know angle α. In some embodiments, the a angle α is about 30 degrees. The sensors/emitters 8102, 8104 are used to detect the width S of the object 8114. When the object 8114 is placed in between the two sensors/emitters 8102, 8104, the first sensor/emitter 8102 emits a signal that is reflected back to the sensor/emitter 8102. Sensor/emitter 8102 sends a signal to processor 2810 which determines a distance L from the sensor/emitter 8102. Similarly, sensor/emitter 8104 emits a signal that is reflected back to the sensor/emitter 8104. Sensor/emitter 8104 sends a signal to processor 2810 which determines a distance R from the sensor/emitter 8102. The processor 2810 determines the width S of the object 8114 by subtracting the distance L and the distance R from the known distance X between the two sensors/emitters 8102, 8104. Based on the width S, the processor 2810 determines the volume of fluid to be dispensed on the object.

In some embodiments, when an object 8114 is placed between the two sensors/emitters 8102, 8104, the first sensor/emitter 8102 emits a signal and receives the reflected signal and then shuts off. After the first sensor/emitter 8102 shuts off, the second sensor/emitter 8104 emits a signal and receives the reflected signal and shuts off. This may be done to prevent cross-contamination of the emitted signals as only one emitter/receiver is operable at a time.

Figure 29A:
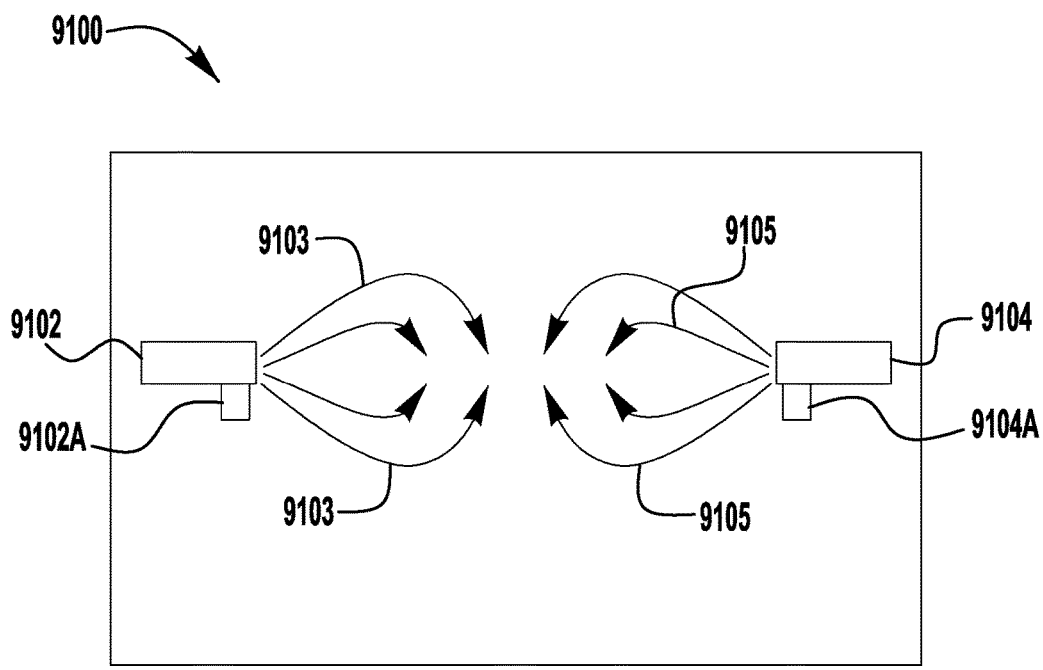
FIGS. 29A and 29B illustrates another exemplary sensing system for a dispenser that detects a parameter indicative of the size of an object.
Figure 29B:
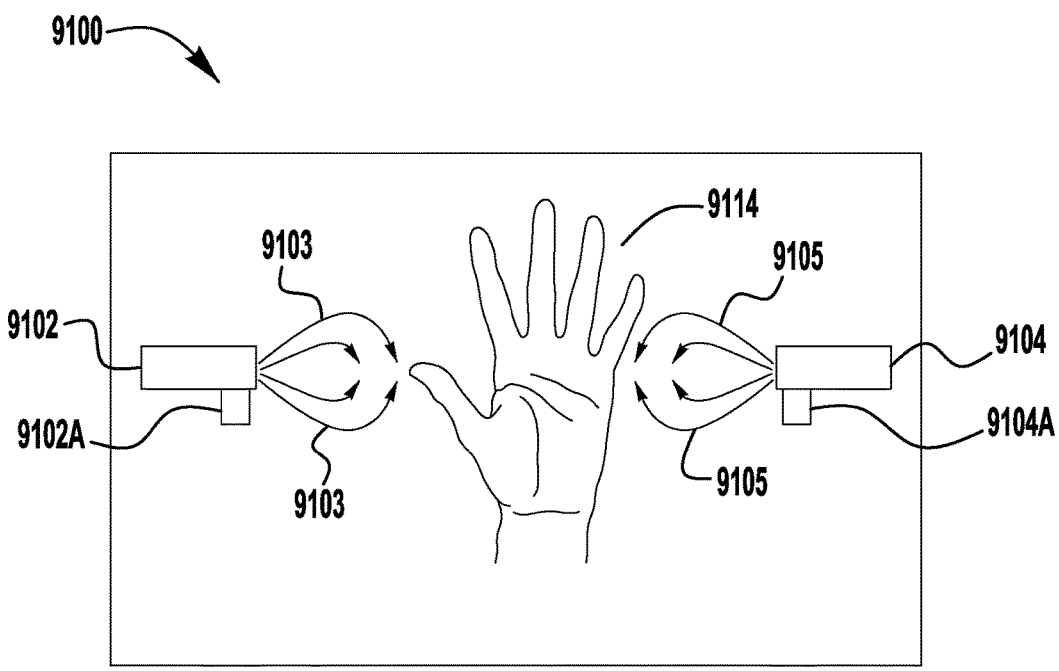

FIGS. 29A, 29B illustrate another exemplary sensor 9100 for a dispenser that detects a parameter indicative of the size of an object 9114 (such as a hand). Any dispenser disclosed in the present application may incorporate the sensor 9100. The exemplary sensor includes two proximity sensors 9102, 9104. In some embodiments, the proximity sensors are radio frequency based intelligent proximity sensors. The radio based intelligent proximity sensors 9102, 9104 create a resonant structure of electric and magnetic fields 9103, 9104 with three-dimensional extent in the same order of magnitude as the size S of an object 9114 to be detected. In this embodiment, as an object 9114 (FIG. 29B) is brought within the extent of the magnetic fields 9103, 9105, a redistribution of electric and magnetic fields 9103, 9105 take place, which modifies the reflection coefficient (i.e., impedance) of the resonant structure monitored through ports 9102A, 9104A. The object 9114, which has its own natural frequencies, perturbs the resonant frequency of the monitoring structure to create a unique set of natural frequencies (poles and zeros). These poles and zeros, depending on the size, shape, material composition and orientation, constitute the radio frequency signature of the object 9114 and can be determined from the measurement of the reflection coefficient. In other words, an object 9114 is measured by its unique radio frequency. In this embodiment, sensor 9100 is calibrated to identify the radio signature of various hand sizes, such as, for example, large hand size, medium hand size and small hand size, such that when a user places their hand in the sensing area, the device reads the radio signature of the hand 9114. The signal is sent to the processor 2810 which compares the radio signature of the hand 9114 to stored data indicative of the hand size, such as, for example large, medium, and small. The processor uses the stored data to determine the volume of fluid to be dispensed.

Figure 30:
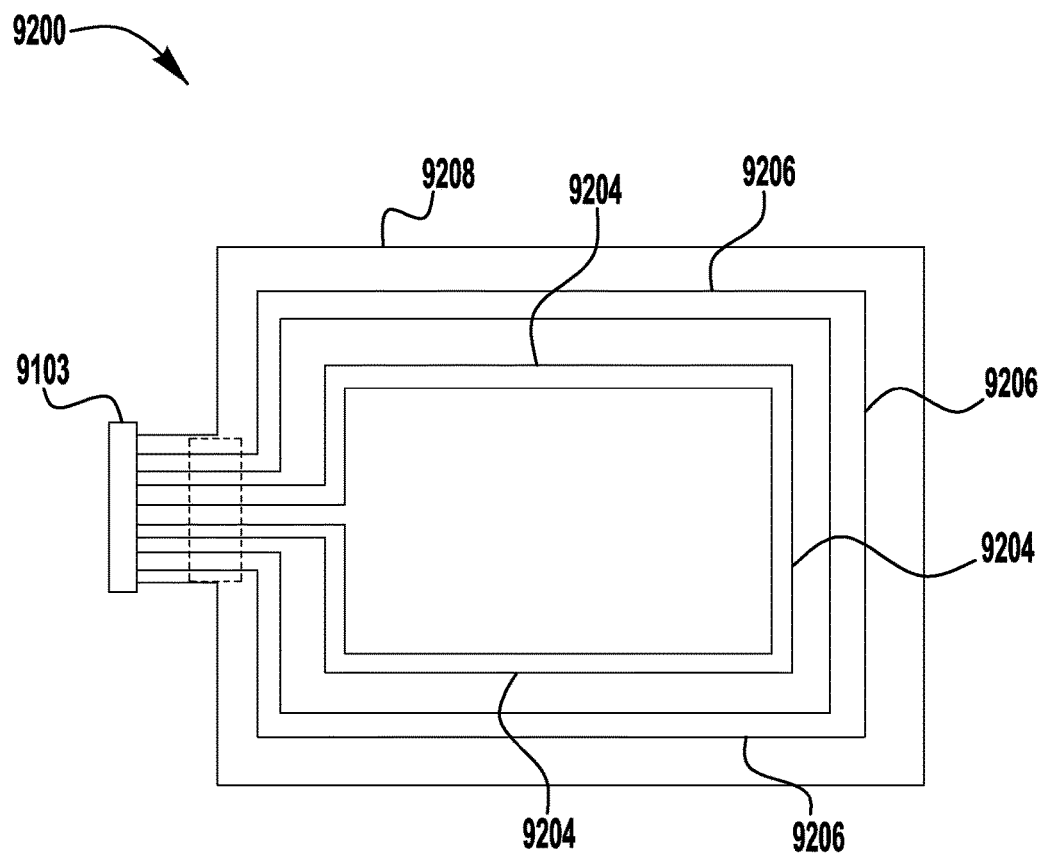
FIG. 30 illustrates another exemplary sensing system for a dispenser that detects a parameter indicative of the size of an object.

FIG. 30 illustrates another exemplary sensor 9200 for a dispenser that detects a parameter indicative of the size of an object (such as a hand). Any dispenser disclosed in the present application may incorporate the sensor 9200. The sensor 9200 is a capacitance based sensor. Sensor 9200 includes a first electrode 9204, for measuring a first parameter, such as, for example, a hand width, and a second electrode 9206 for measuring a second parameter, such as, for example, a hand length. First electrode 9204 and second electrode 9406 are separated from one another and enclosed within a film, such as, for example, a PET film. First electrode 9204 and 9206 are connected to a connector 9103 for connecting to a controller (not shown) in dispenser (not shown). The controller (not shown) is in circuit communication with processor 2810. When sensor 9200 is energized, the electrodes 9204, 9206 create an electric field. When an object, such as a hand or finger, moves into the field the electric field is distorted. The controller can sense the distortion and location of the distortion. Based on the sensed distortion, the controller/and or processor 2810 can determine a width and a length of the object or hand that is within its sensing field. In some embodiments, the controller/processor 2810 turns on and off electric fields to first determine a width and then determine a length of the object or hand. In some embodiments, the controller/processor 2810 determines only the width of the object or hand. In some embodiments the controller/processor 2810 determines only the length of the hand. In some embodiments, the controller/processor 2810 compares the width to the length to determine whether the measurements are within an acceptable range of one another to determine whether the measurements are accurate or need to be retaken. Based on one or more of the calculated parameters, the processor 2810 determines a volume of fluid to be dispensed and provides a signal to the actuator to dispense the fluid.

Figure 31:
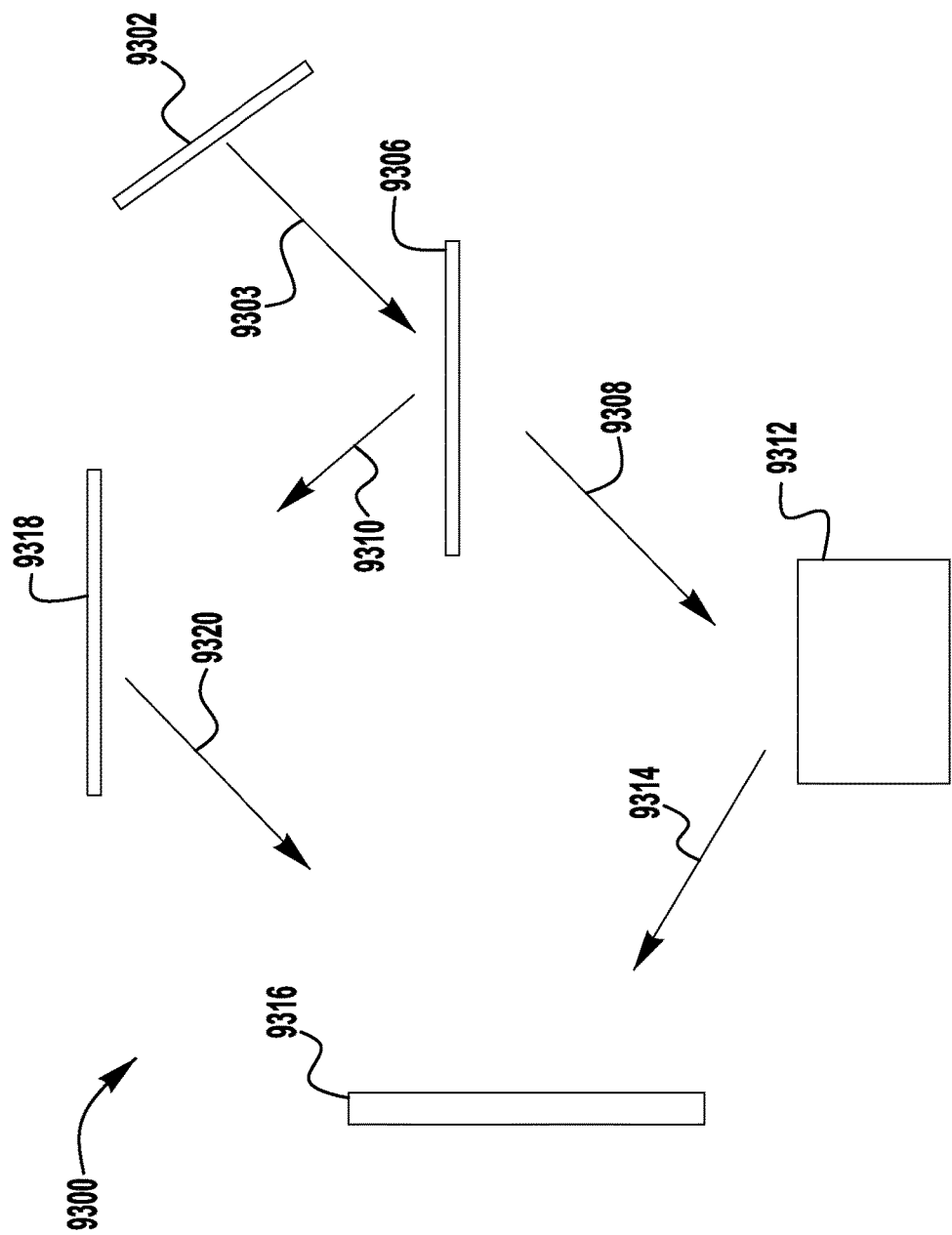
FIG. 31 illustrates another exemplary sensing system for a dispenser that detects a parameter indicative of the size of an object.

FIG. 31 illustrates another exemplary sensor 9300 for a dispenser that detects a parameter indicative of the size of an object (such as a hand). Any dispenser disclosed in the present application may incorporate the sensor 9300. The sensor 9300 is a holographic based hand six measurement sensor. The exemplary embodiment includes a low power laser 9302, such as a low power laser on a chip, a beam splitter 9306, such as a low coast PMMA plastic beam splitter, mirror 9318, such as a low cost plastic mirror, and a camera 9316, such as a camera on a chip.

In its simplest forms, the holographic based sensor operates as follows. Light waves 9303 are emitted from laser 9302 and are directed at beam splitter 9306. Beam splitter 9306 splits the light waves into two sets of light waves 9308, 9310. Light waves 9308 are directed at an object 9312, (such as a hand), if one is present. Light waves 9314 are reflected of the object 9312 if present are directed toward the camera 9316. Light waves 9310 are directed toward mirror 9318 and light waves 9320 are directed toward the camera 9316. The light waves from the object 9312 are digitally captured by synthetic-aperture phase-shifting digital holography, where the image sensor is moved to cover the area over which the object waves are spread. A captured data set represents the spectrum of the object 9312 waves, because a lensless Fourier setup (i.e., a spherical reference wave) is used as capturing optics. Therefore, light waves from the object are numerically reconstructed by a simple fast-Fourier transform. Fourier transformation converts the sampling interval of the object waves to a suitably small value for construction of the computer based hologram. The processor 2810 uses the computer based hologram to determine the hand size and determines the correct volume of fluid to be dispensed on the hand. In some embodiments, the processor 2810 determines location of the hand and whether the hand is in the correct location for dispensing the fluid. If the person's hand is in the wrong location, the dispenser may indicate that the user needs to reposition their hand prior to dispensing.

In some exemplary embodiments, memory 2812 contains a data base that correlates hand sizes to or parameter measurements to volume of fluid dispensed or dose size. For example, if hand width (or palm width) is 3.1 inches or less, the processor 2810 determines that a "small" dose fluid should be dispensed. If the hand width is greater than 3.1 but less than 3.5 the processor 2810 determines that a "medium" dose fluid should be dispensed; and if hand width (or palm width) is 3.5 inches or more, the processor 2810 determines that a "large" dose fluid should be dispensed. In another example, if hand length (fingertip to wrist) is 7.1 inches or less, the processor 2810 determines that a "small" dose fluid should be dispensed. If the hand length is greater than 7.1 but less than 8.3 the processor 2810 determines that a "medium" dose fluid should be dispensed; and if hand length is 8.3 inches or more, the processor 2810 determines that a "large" dose fluid should be dispensed. In some embodiments, the volume of fluid dispensed is a function of the physical parameter being measured. In some embodiments, the volume of fluid dispensed is directly related to the physical parameter being measured. In some embodiments, the volume of fluid dispensed is proportional to the physical parameter being measured. In some embodiments, a minimum dose is set, so that any measurement that is under a predetermined reference, receives a minimum dose. For example, if the minimum dose is 1 ml of fluid and the predetermined reference is a hand with of 3.0 inches, hand widths that are 2.9 inches, 2.7 inches, 2.5 inches or 3.0 inches will all receive 1 ml of fluid. In some embodiments a maximum dose is set so that any measurement that is over a predetermined reference receives a set maximum dose. For example, if the set maximum dose is 2 ml and the predetermined reference is, for example, a hand with of 3.8 inches, then any hand with measurement of 3.8 inches or greater will receive 2 ml of fluid.

Figure 32:
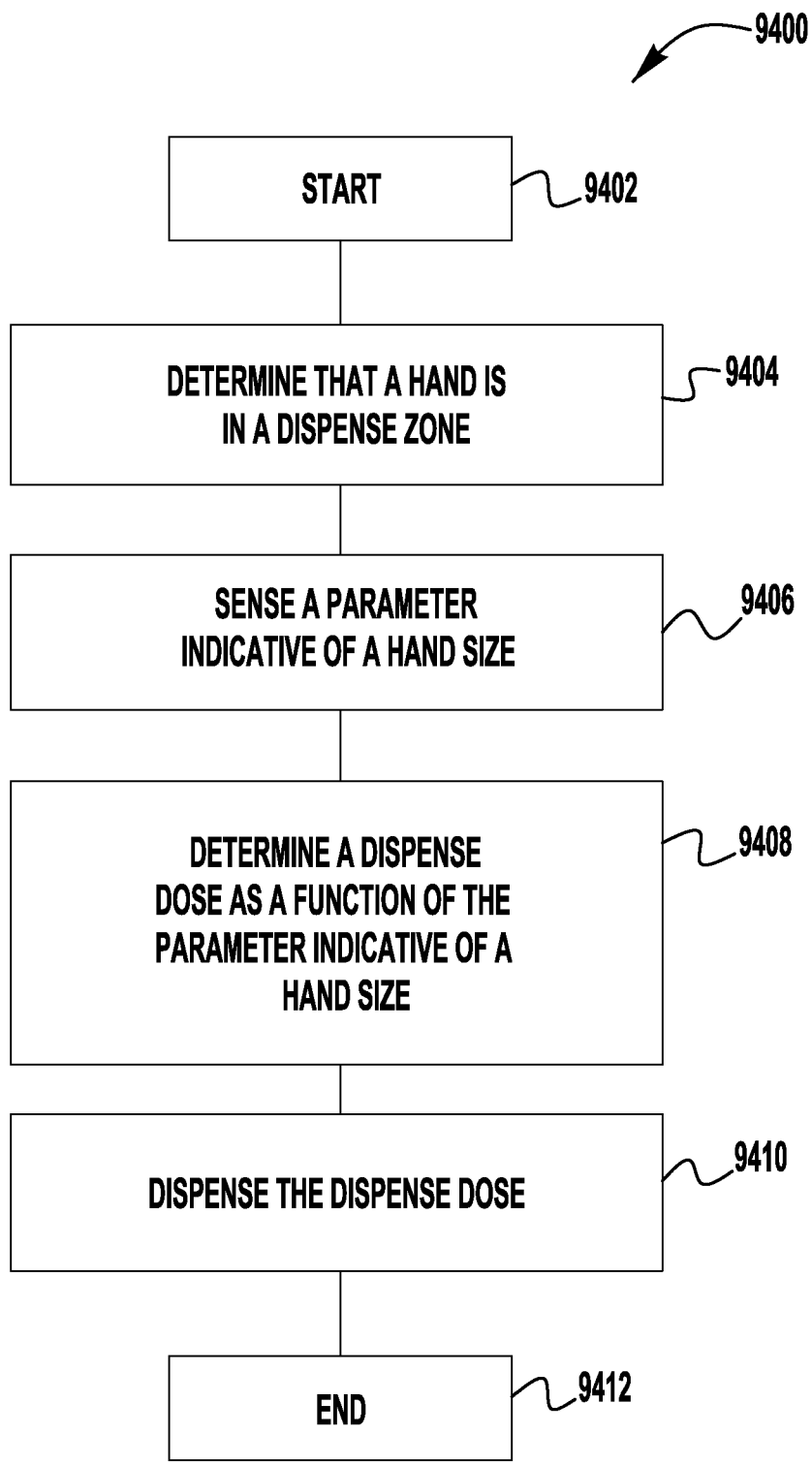
FIG. 32 illustrates an exemplary methodology of a dispenser system that dispenses a volume of fluid as a function of a parameter indicative of the size of a hand.

FIG. 32 is an exemplary methodology 9400 for dispensing a volume of fluid that is sized as a function of hand size. The exemplary methodology 9400 begins at block 9402. At block 9404 a determination is made that a hand is present in a dispense zone. This may be accomplished by, for example, and infrared sensor/emitter, or any of the sensor described herein. At block 9406 a parameter indicative of a hand size is sensed. This may be accomplished in any manner, such as, for example, in any of the embodiments described in detail herein. At block 9408 a dispense dose is determined. The dispense dose is a function of the sensed parameter that is indicative of a hand size. At block 9410 the determined dispense dose is dispensed and the methodology ends at block 9412.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Moreover, elements described with one embodiment may be readily adapted for use with other embodiments. Therefore, the invention, in its broader aspects, is not limited to the specific details, the representative apparatus, and illustrative examples shown and described. Accordingly, departures may be made from such details without departing from the spirit or scope of the applicants' general inventive concept.

The invention claimed is:

1. A dispenser for dispensing a soap, sanitizer or lotion, the dispenser comprising:
    a housing;
    a processor in the housing;
    a reservoir for holding fluid;
    a pump for pumping the fluid;
    a sensor assembly comprising at least two sensors for sensing a parameter that is indicative of a user's hand size;
    wherein, after the at least two sensors sense the parameter that is indicative of the user's hand size, the sensor assembly sends a signal to the processor that includes the sensed parameter;
    wherein the processor is configured to determine a width of the user's hand based on the sensed parameter of the at least two sensors;
    wherein the processor is configured to determine a dose volume of fluid to be dispensed as a function of the determined width of the user's hand;
    wherein the processor causes the pump to dispense the dose volume.

2. The dispenser of claim 1, wherein the dose volume of fluid to be dispensed is selected from a group of dose volumes and wherein the group contains at least two different dose volumes.

3. The dispenser of claim 1, wherein the processor is configured to determine a length of the user's hand based on the sensed parameter of the at least two sensors, and wherein the processor is configured to determine a dose volume of the fluid to be dispensed as a function of the determined length of the user's hand.

4. The dispenser of claim 1, wherein at least one of the at least two sensors comprises an image capturing sensor.

5. The dispenser of claim 1, wherein the at least two sensors comprise a first sensor for measuring a first distance from the first sensor to a first portion of the user's hand and a second sensor for measuring a second distance from the second sensor to a second portion of the user's hand.

6. The dispenser of claim 1, wherein at least one of the at least two sensors comprises at least two emitters and an array of receivers.

7. The dispenser of claim 1, wherein at least one of the at least two sensors comprises at least two emitters and at least two receivers.

8. The dispenser of claim 1, wherein at least one of the at least two sensors comprises one of an infrared emitter, a laser, an electric field and a magnetic field.

9. The dispenser of claim 1, wherein at least one of the at least two sensors comprises at least one reflective member for reflecting a light source toward a receiver.

10. A dispenser for dispensing a soap, sanitizer or lotion, the dispenser comprising:
   a housing;
   a processor in the housing;
   a reservoir for holding fluid;
   a pump for pumping the fluid;
   a sensor assembly comprising at least two emitters and an array of receivers for sensing a parameter that is indicative of a user's hand size;
   wherein, after the sensor assembly senses the parameter that is indicative of the user's hand size, the sensor assembly sends a signal to the processor that includes the sensed parameter by the at least two emitters and the array of receivers;
   wherein the processor is configured to determine a width of the user's hand based on the sensed parameter by the at least two emitters and the array of receivers;
   wherein the processor is configured to determine a width of the user's hand based on the sensed parameter by the at least two emitters and the array of receivers;
   wherein the processor is configured to determine a dose volume of fluid to be dispensed as a function of the determined width of the user's hand;
   wherein the processor causes the pump to dispense the dose volume.

11. The dispenser of claim 10, wherein the dose volume of fluid to be dispensed is selected from a group of dose volumes and wherein the group contains at least two different dose volumes.

12. The dispenser of claim 10, wherein the processor is configured to determine a length of the user's hand based on the sensed parameter of the sensor assembly, and wherein the processor is configured to determine a dose volume of the fluid to be dispensed as a function of the determined length of the user's hand.

13. A dispenser for dispensing a soap, sanitizer or lotion, the dispenser comprising:
   a housing;
   a processor in the housing;
   a reservoir for holding fluid;
   a pump for pumping the fluid;
   a sensor assembly comprising at least one reflective member configured to reflect a light source toward a receiver, wherein the sensor assembly is configured to sense a parameter that is indicative of a user's hand size;
   wherein, after the sensory assembly senses the parameter that is indicative of a user's hand size, the sensor assembly sends a signal to the processor that includes the sensed parameter by the sensory assembly;
   wherein the processor is configured to determine a width of the user's hand based on the sensed parameter by the sensor assembly;
   wherein the processor is configured to determine a dose volume of fluid to be dispensed as a function of the determined width of the user's hand;
   wherein the processor causes the pump to dispense the dose volume.

14. The dispenser of claim 13, wherein the dose volume of fluid to be dispensed is selected from a group of dose volumes and wherein the group contains at least two different dose volumes.

15. The dispenser of claim 13, wherein the processor is configured to determine a length of the user's hand based on the sensed parameter of the at least two sensors, and wherein the processor is configured to determine a dose volume of the fluid to be dispensed as a function of the determined length of the user's hand.

* * * * *